United States Patent
Yoo et al.

(10) Patent No.: US 10,285,117 B2
(45) Date of Patent: May 7, 2019

(54) TECHNIQUES FOR COEXISTENCE BETWEEN ENHANCED COMPONENT CARRIER COMMUNICATIONS AND NON-ENHANCED COMPONENT CARRIER COMMUNICATIONS

(71) Applicant: QUALCOMM Incorporated, San Diego, CA (US)

(72) Inventors: Taesang Yoo, Riverside, CA (US); Hao Xu, San Diego, CA (US); Durga Prasad Malladi, San Diego, CA (US); Yongbin Wei, La Jolla, CA (US); Siddhartha Mallik, San Diego, CA (US); Jing Sun, San Diego, CA (US); Madhavan Srinivasan Vajapeyam, San Diego, CA (US); Jun Wang, Poway, CA (US); Tao Luo, San Diego, CA (US); Xiaoxia Zhang, San Diego, CA (US); Wanshi Chen, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 15/143,821

(22) Filed: May 2, 2016

(65) Prior Publication Data

US 2016/0345249 A1    Nov. 24, 2016

Related U.S. Application Data

(60) Provisional application No. 62/164,972, filed on May 21, 2015.

(51) Int. Cl.
*H04W 4/00* (2018.01)
*H04W 48/16* (2009.01)
(Continued)

(52) U.S. Cl.
CPC ............. *H04W 48/16* (2013.01); *H04L 5/001* (2013.01); *H04W 4/06* (2013.01); *H04W 16/14* (2013.01);
(Continued)

(58) Field of Classification Search
None
See application file for complete search history.

(56) References Cited

U.S. PATENT DOCUMENTS

| 9,986,586 B2 * | 5/2018 | Lee ................... H04W 74/0816 |
| | | 370/328 |
| 2013/0163447 A1 * | 6/2013 | Koskela ................. H04L 5/001 |
| | | 370/252 |

(Continued)

FOREIGN PATENT DOCUMENTS

WO    WO-2011116242 A1    9/2011

OTHER PUBLICATIONS

ISA/EP, International Search Report and Written Opinion of the International Searching Authority, Int'l Application No. PCT/US2016/030548, dated Sep. 7, 2016, European Patent Office, Rijswijk, NL, 25 pgs.

(Continued)

*Primary Examiner* — Anh Vu H Ly
(74) *Attorney, Agent, or Firm* — Holland & Hart LLP

(57) ABSTRACT

Techniques are described for wireless communication. One method for wireless communication at a base station includes contending for access to a shared channel of a shared radio frequency spectrum band, and multiplexing first component carrier (CC) communication windows and second CC communication windows in the shared channel. A duration of orthogonal frequency domain multiplexed (OFDM) symbols of the first CC communication windows may be different from a duration of OFDM symbols of the (Continued)

second CC communication windows, and the multiplexing may occur on the shared channel upon winning contention for access to the shared channel. One method for wireless communication at a user equipment (UE) includes monitoring a shared channel of a shared radio frequency spectrum band for a first CC Listen Before Talk (LBT) frame, and receiving, in a second CC preamble, an indication of the first CC LBT frame.

45 Claims, 22 Drawing Sheets

(51) Int. Cl.
*H04W 16/14* (2009.01)
*H04W 74/08* (2009.01)
*H04L 5/00* (2006.01)
*H04W 4/06* (2009.01)
*H04W 76/10* (2018.01)

(52) U.S. Cl.
CPC ....... *H04W 74/0808* (2013.01); *H04W 76/10* (2018.02)

(56) References Cited

U.S. PATENT DOCUMENTS

| | | | | |
|---|---|---|---|---|
| 2013/0203458 A1* | 8/2013 | Charbit | H04W 52/34 | 455/522 |
| 2014/0044105 A1* | 2/2014 | Bontu | H04L 5/001 | 370/336 |
| 2015/0085797 A1 | 3/2015 | Ji et al. | | |
| 2015/0103782 A1* | 4/2015 | Xu | H04L 5/001 | 370/329 |
| 2015/0341921 A1* | 11/2015 | Chen | H04W 72/0413 | 370/330 |
| 2015/0358827 A1* | 12/2015 | Bendlin | H04W 72/0413 | 455/454 |
| 2016/0021661 A1* | 1/2016 | Yerramalli | H04W 16/14 | 370/329 |
| 2016/0057731 A1* | 2/2016 | Damnjanovic | H04W 68/005 | 455/458 |
| 2016/0073344 A1* | 3/2016 | Vutukuri | H04W 52/0216 | 370/252 |
| 2016/0143014 A1* | 5/2016 | Mukherjee | H04W 74/0816 | 370/330 |
| 2016/0183296 A1* | 6/2016 | Yerramalli | H04W 16/14 | 370/329 |
| 2016/0278078 A1* | 9/2016 | Cheng | H04W 72/0446 | 370/328 |
| 2016/0278088 A1* | 9/2016 | Cheng | H04L 47/27 | 370/328 |
| 2016/0302182 A1* | 10/2016 | Nogami | H04L 5/0041 | 370/328 |
| 2016/0323915 A1* | 11/2016 | Liu | H04W 16/14 | 370/328 |
| 2017/0013469 A1* | 1/2017 | Larsson | H04W 16/14 | 370/328 |
| 2017/0202043 A1* | 7/2017 | Seo | H04W 76/023 | 370/328 |
| 2017/0288794 A1* | 10/2017 | Yerramalli | H04W 16/14 | 370/328 |
| 2017/0367092 A1* | 12/2017 | Kim | H04W 72/0446 | 370/328 |
| 2018/0006778 A1* | 1/2018 | Damnjanovic | H04W 72/0446 | 370/328 |

OTHER PUBLICATIONS

Broadcom Corporation, "Alternatives for LAA LBT Energy Detection Threshold Adaptation," 3GPP TSG RAN WG1 Meeting #81, R1-152939, Fukuoka, Japan, May 25-29, 2015, 4 pgs., XP_50970032A, 3rd Generation Partnership Project.

ETRI, "Discussion on DRS Transmission for Carrier Selection," 3GPP TSG RAN WG1, Meeting #80bis, R1-152096, Belgrade, Serbia, Apr. 20-24, 2015, 3 pgs., XP_50934944A, 3rd Generation Partnership Project.

ISA/EPO, Partial International Search Report of the International Searching Authority, Int'l. App. No. PCT/US2016/030548, dated Jul. 21, 2016, European Patent Office, Rijswijk, NL, 8 pgs.

LG Electronics, "DL/UL Solutions of LAA with LBT," 3GPP TSG RAN WG1 Meeting #80, R1-150214, Athens, Greece, Feb. 9-13, 2015, 10 pgs., XP_50933428A, 3rd Generation Partnership Project.

Qualcomm Incorporated, "Physical Layer Options for LAA," 3GPP TSG RAN WG1 #80, R1-150477, Athens, Greece, Feb. 9-13, 2015, 8 pgs., XP_30933685A, 3rd Generation Partnership Project.

Qualcomm Incorporated, "Multi-carrier LBT Operation for LAA," 3GPP TSG RAN WG1 #81, R1-152784, Fukuoka, Japan, May 25-29, 2015, 6 pgs., 3rd Generation Partnership Project.

Qualcomm Incorporated, "Discovery Procedure, RRM, CQI Measurements and Reporting for LAA," 3GPP TSG RAN WG1 #81, R1-152788, Fukuoka, Japan, May 25-29, 2015, 3 pgs., 3rd Generation Partnership Project.

* cited by examiner

TECHNIQUES FOR COEXISTENCE BETWEEN ENHANCED COMPONENT CARRIER COMMUNICATIONS AND NON-ENHANCED COMPONENT CARRIER COMMUNICATIONS

CROSS REFERENCES

The present Application for Patent claims priority to U.S. Provisional Patent Application No. 62/164,972 by Yoo et al., entitled "Techniques For Coexistence Between Enhanced Component Carrier Communications and Non-Enhanced Component Carrier Communications," filed May 21, 2015, assigned to the assignee hereof.

BACKGROUND

Field of the Disclosure

The present disclosure, for example, relates to wireless communication systems, and more particularly to techniques for providing coexistence between enhanced component carrier (eCC) communications and non-eCC communications.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

In some wireless communication systems, base stations and UEs may communicate over a radio frequency spectrum band using different types of component carriers (CCs), such as enhanced component carriers (eCCs) or non-eCCs. When base stations and UEs communicating via different types of CCs share a radio frequency spectrum band, or when base stations and UEs share a radio frequency spectrum band with devices using other types of communications, techniques may be employed to avoid, mitigate, or cancel interference caused by use of the different types of CCs or communication technologies.

SUMMARY

The present disclosure, for example, relates to techniques for providing coexistence between enhanced component carrier (eCC) communications and non-eCC communications. The techniques may enable a base station to communicate with eCC capable UEs and non-eCC capable UEs, in parallel, on a shared channel of a shared radio frequency spectrum band. In some examples, the techniques employ frequency division multiplexing (FDM) or time division multiplexing (TDM) of eCC and non-eCC communications in a shared channel. When TDM techniques are used, eCC communication windows and non-eCC communication windows may be multiplexed at a radio frame level or lower (e.g., within a Listen Before Talk (LBT) frame). Preamble transmissions may be managed to give UEs and other devices (e.g., Wi-Fi devices) notice of when a shared channel is being used for eCC communications or non-eCC communications. In some examples, discovery reference signals (DRSs) may be transmitted by a base station to indicate to UEs that a base station is eCC capable or non-eCC capable.

In a first set of illustrative examples, a method for wireless communication at a base station is described. In one configuration, the method may include contending for access to a shared channel of a shared radio frequency spectrum band, and multiplexing first CC communication windows and second CC communication windows in the shared channel. A duration of orthogonal frequency domain multiplexed (OFDM) symbols of the first CC communication windows may be different from a duration of OFDM symbols of the second CC communication windows, and the multiplexing may occur on the shared channel upon winning contention for access to the shared channel.

In some examples, the multiplexing may include frequency domain multiplexing the first CC communication windows and the second CC communication windows in the shared channel. In some examples, the multiplexing may include time division multiplexing the first CC communication windows and the second CC communication windows in the shared channel. In some examples, the time division multiplexing may be performed at an LBT frame level. In some examples, the method may include signaling a partitioning between the first CC communication windows and the second CC communication windows in a control channel of an LBT frame. In some examples, the method may include transmitting to a first CC capable UE a first grant of resources for first CC communications. In some examples, the method may include transmitting to a second CC capable UE a second grant of resources for second CC communications. In some examples, contending for access to the shared channel may be performed for each of a number of LBT frames, and access to the shared channel may be won for a first LBT frame. In some examples, the first LBT frame may include a first CC LBT frame, and the method may include transmitting, in the first CC LBT frame, a second CC preamble, a first CC preamble, and a first CC control/data portion. In some examples, the method may include transmitting a Wi-Fi preamble in the second CC preamble. In some examples, the first LBT frame may include a first CC LBT frame, and the method may include transmitting, in the first CC LBT frame, a second CC preamble and a first CC control/data portion, without a first CC preamble. In some examples, the method may include transmitting a Wi-Fi preamble in the second CC preamble. In some examples, the method may include transmitting a second CC preamble during the first LBT frame, and transmitting, in the second CC preamble, an indication of whether the first LBT frame is configured as a first CC LBT frame or a second CC LBT frame. In some examples, the indication may include at least a scrambling, or a public land mobile network (PLMN) identifier (ID), or a cell ID, or control signaling, or a sequence, or a combination thereof. In some examples, the first LBT frame may include a first CC LBT frame, and the method may include transmitting, in the first CC LBT frame, a first CC preamble and a first CC control/data portion. In some examples, the method may include transmitting a Wi-Fi preamble in the first CC preamble.

In some examples, the method may include broadcasting a second CC DRS in each of a plurality of discovery time periods. In some examples, the method may include broadcasting in the second CC DRS an indication of support for first CC communications. In some examples, the method may include receiving a second CC connection request from a UE, establishing a second CC connection with the UE, receiving an indication that the UE is first CC capable, and configuring a first CC connection with the UE after receiving the indication that the UE is first CC capable. In some examples, the method may include broadcasting a first CC DRS and a second CC DRS in each of a plurality of discovery time periods. In some examples, the method may include broadcasting a first CC DRS in each of a plurality of first CC discovery time periods, and broadcasting a second CC DRS in each of a plurality of second CC discovery time periods. In some examples, the method may include broadcasting a first CC DRS or a second CC DRS in each of a plurality of discovery time periods. In some examples, the first CC communication windows may include at least one eCC and the second CC communication windows may include at least one non-eCC.

In a second set of illustrative examples, an apparatus for wireless communication at a base station is described. In one configuration, the apparatus may include means for contending for access to a shared channel of a shared radio frequency spectrum band, and means for multiplexing first CC communication windows and second CC communication windows in the shared channel. A duration of OFDM symbols of the first CC communication windows may be different from a duration of OFDM symbols of the second CC communication windows, and the multiplexing may occur on the shared channel upon winning contention for access to the shared channel. In some examples, the apparatus may further include means for implementing one or more aspects of the method for wireless communication described above with respect to the first set of illustrative examples.

In a third set of illustrative examples, another apparatus for wireless communication at a base station is described. In one configuration, the apparatus may include a processor, memory in electronic communication with the processor, and instructions stored in the memory. The instructions may be executable by the processor to contend for access to a shared channel of a shared radio frequency spectrum band, and to multiplex first CC communication windows and second CC communication windows in the shared channel. A duration of OFDM symbols of the first CC communication windows may be different from a duration of OFDM symbols of the second CC communication windows, and the multiplexing may occur on the shared channel upon winning contention for access to the shared channel. In some examples, the instructions may also be executable by the processor to implement one or more aspects of the method for wireless communication described above with respect to the first set of illustrative examples.

In a fourth set of examples, a non-transitory computer-readable medium storing computer-executable code for wireless communication is described. In one configuration, the code may be executable by a processor to contend for access to a shared channel of a shared radio frequency spectrum band, and to multiplex first CC communication windows and second CC communication windows in the shared channel. A duration of OFDM symbols of the first CC communication windows may be different from a duration of OFDM symbols of the second CC communication windows, and the multiplexing may occur on the shared channel upon winning contention for access to the shared channel. In some examples, the non-transitory computer-readable medium may also include code to implement one or more aspects of the method for wireless communication described above with respect to the first set of illustrative examples.

In a fifth set of illustrative examples, a method for wireless communication at a UE is described. In one configuration, the method may include monitoring a shared channel of a shared radio frequency spectrum band for a first CC LBT frame, and receiving, in a second CC preamble, an indication of the first CC LBT frame.

In some examples, the method may include receiving the indication of the first CC LBT frame in a control channel of the second CC preamble. In some examples, the method may include receiving a first CC transmission in the first CC LBT frame, where the first CC transmission includes a first CC preamble and a first CC control/data portion. In some examples, the method may include receiving a first CC transmission in the first CC LBT frame, where the first CC transmission includes a first CC control/data portion transmitted without a first CC preamble. In some examples, the method may include receiving a Wi-Fi preamble in the second CC preamble. In some examples, the method may include obtaining, from the second CC preamble, a channel estimation for the shared channel.

In a sixth set of illustrative examples, an apparatus for wireless communication at a UE is described. In one configuration, the apparatus may include means for monitoring a shared channel of a shared radio frequency spectrum band for a first CC LBT frame, and means for receiving, in a second CC preamble, an indication of the first CC LBT frame. In some examples, the apparatus may further include means for implementing one or more aspects of the method for wireless communication described above with respect to the fifth set of illustrative examples.

In a seventh set of illustrative examples, another apparatus for wireless communication at a UE is described. In one configuration, the apparatus may include a processor, memory in electronic communication with the processor, and instructions stored in the memory. The instructions may be executable by the processor to monitor a shared channel of a shared radio frequency spectrum band for a first CC LBT frame, and to receive, in a second CC preamble, an indication of the first CC LBT frame. In some examples, the instructions may also be executable by the processor to implement one or more aspects of the method for wireless communication described above with respect to the fifth set of illustrative examples.

In an eighth set of illustrative examples, a non-transitory computer-readable medium storing computer-executable code for wireless communication is described. In one configuration, the code may be executable by a processor to monitor a shared channel of a shared radio frequency spectrum band for a first CC LBT frame, and to receive, in a second CC preamble, an indication of the first CC LBT frame. In some examples, the non-transitory computer-readable medium may also include code to implement one or more aspects of the method for wireless communication described above with respect to the fifth set of illustrative examples.

In a ninth set of illustrative examples, another method for wireless communication at a UE is described. In one configuration, the method may include monitoring a shared channel of a shared radio frequency spectrum band for a second CC LBT frame, receiving a second CC preamble indicating that a first CC LBT frame is being transmitted, and entering a sleep state for a remainder of the first CC LBT frame.

In a tenth set of illustrative examples, another apparatus for wireless communication at a UE is described. In one configuration, the apparatus may include means for monitoring a shared channel of a shared radio frequency spectrum band for a second CC LBT frame, means for receiving a second CC preamble indicating that a first CC LBT frame is being transmitted, and means for entering a sleep state for a remainder of the first CC LBT frame. In some examples, the apparatus may further include means for implementing one or more aspects of the method for wireless communication described above with respect to the ninth set of illustrative examples.

In an eleventh set of illustrative examples, another apparatus for wireless communication at a UE is described. In one configuration, the apparatus may include a processor, memory in electronic communication with the processor, and instructions stored in the memory. The instructions may be executable by the processor to monitor a shared channel of a shared radio frequency spectrum band for a second CC LBT frame, to receive a second CC preamble indicating that a first CC LBT frame is being transmitted, and to enter a sleep state for a remainder of the first CC LBT frame. In some examples, the instructions may also be executable by the processor to implement one or more aspects of the method for wireless communication described above with respect to the ninth set of illustrative examples.

In a twelfth set of illustrative examples, another non-transitory computer-readable medium storing computer-executable code for wireless communication is described. In one configuration, the code may be executable by a processor to monitor a shared channel of a shared radio frequency spectrum band for a second CC LBT frame, to receive a second CC preamble indicating that a first CC LBT frame is being transmitted, and to enter a sleep state for a remainder of the first CC LBT frame. In some examples, the non-transitory computer-readable medium may also include code to implement one or more aspects of the method for wireless communication described above with respect to the ninth set of illustrative examples.

In a thirteenth set of illustrative examples, another method for wireless communication at a UE is described. In one configuration, the method may include acquiring a second CC cell of a base station, determining the base station supports first CC communications subsequent to acquiring the second CC cell, and communicating with the base station using first CC communications upon determining the base station supports first CC communications.

In some examples, the method may include receiving a second CC DRS from the base station, and acquiring the second CC cell of the base station based at least in part on the second CC DRS. In some examples, determining the base station supports first CC communications may include receiving an indication that the base station supports first CC communications in the second CC DRS. In some examples, the method may include using OFDM numerology of a second CC while receiving the second CC DRS, and using OFDM numerology of a first CC while communicating with the base station using first CC communications. In some examples, determining the base station supports first CC communications may include receiving second CC configuration information from the base station after acquiring the second CC cell of the base station. In some examples, determining the base station supports first CC communications may include receiving a first CC DRS from the base station, and the method may include establishing a first CC connection with the base station.

In a fourteenth set of illustrative examples, another apparatus for wireless communication at a UE is described. In one configuration, the apparatus may include means for acquiring a second CC cell of a base station, means for determining the base station supports first CC communications subsequent to acquiring the second CC cell, and means for communicating with the base station using first CC communications upon determining the base station supports first CC communications. In some examples, the apparatus may further include means for implementing one or more aspects of the method for wireless communication described above with respect to the thirteenth set of illustrative examples.

In a fifteenth set of illustrative examples, another apparatus for wireless communication at a UE is described. In one configuration, the apparatus may include a processor, memory in electronic communication with the processor, and instructions stored in the memory. The instructions may be executable by the processor to acquire a second CC cell of a base station, to determine the base station supports first CC communications subsequent to acquiring the second CC cell, and to communicate with the base station using first CC communications upon determining the base station supports first CC communications. In some examples, the instructions may also be executable by the processor to implement one or more aspects of the method for wireless communication described above with respect to the thirteenth set of illustrative examples.

In a sixteenth set of illustrative examples, another non-transitory computer-readable medium storing computer-executable code for wireless communication is described. In one configuration, the code may be executable by a processor to acquire a second CC cell of a base station, to determine the base station supports first CC communications subsequent to acquiring the second CC cell, and to communicate with the base station using first CC communications upon determining the base station supports first CC communications. In some examples, the non-transitory computer-readable medium may also include code to implement one or more aspects of the method for wireless communication described above with respect to the thirteenth set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label.

Further, various components of the same may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques are described for providing coexistence between enhanced component carrier (eCC) communications and non-eCC communications on a shared channel of a shared radio frequency spectrum band. In some examples, the shared radio frequency spectrum band may be used for Long Term Evolution (LTE) or LTE-Advanced (LTE-A) communications. The shared radio frequency spectrum band may be used in combination with, or independent from, a dedicated radio frequency spectrum band. The dedicated radio frequency spectrum band may be a radio frequency spectrum band for which transmitting apparatuses may not contend for access because the radio frequency spectrum band is licensed to particular users (e.g., a licensed radio frequency spectrum band usable for LTE/LTE-A communications). The shared radio frequency spectrum band may be a radio frequency spectrum band for which a device may need to contend for access (e.g., a radio frequency spectrum band that is available for unlicensed use, such as Wi-Fi use, or a radio frequency spectrum band that is available for use by multiple operators in an equally shared or prioritized manner). The shared channel of the shared radio frequency spectrum band may be a channel used by a base station or user equipment (UE) for both eCC communications and non-eCC communications. The shared channel, or portions thereof, may also be used by other devices, such as Wi-Fi devices. The other devices may use other communication technologies (e.g., Wi-Fi technologies).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
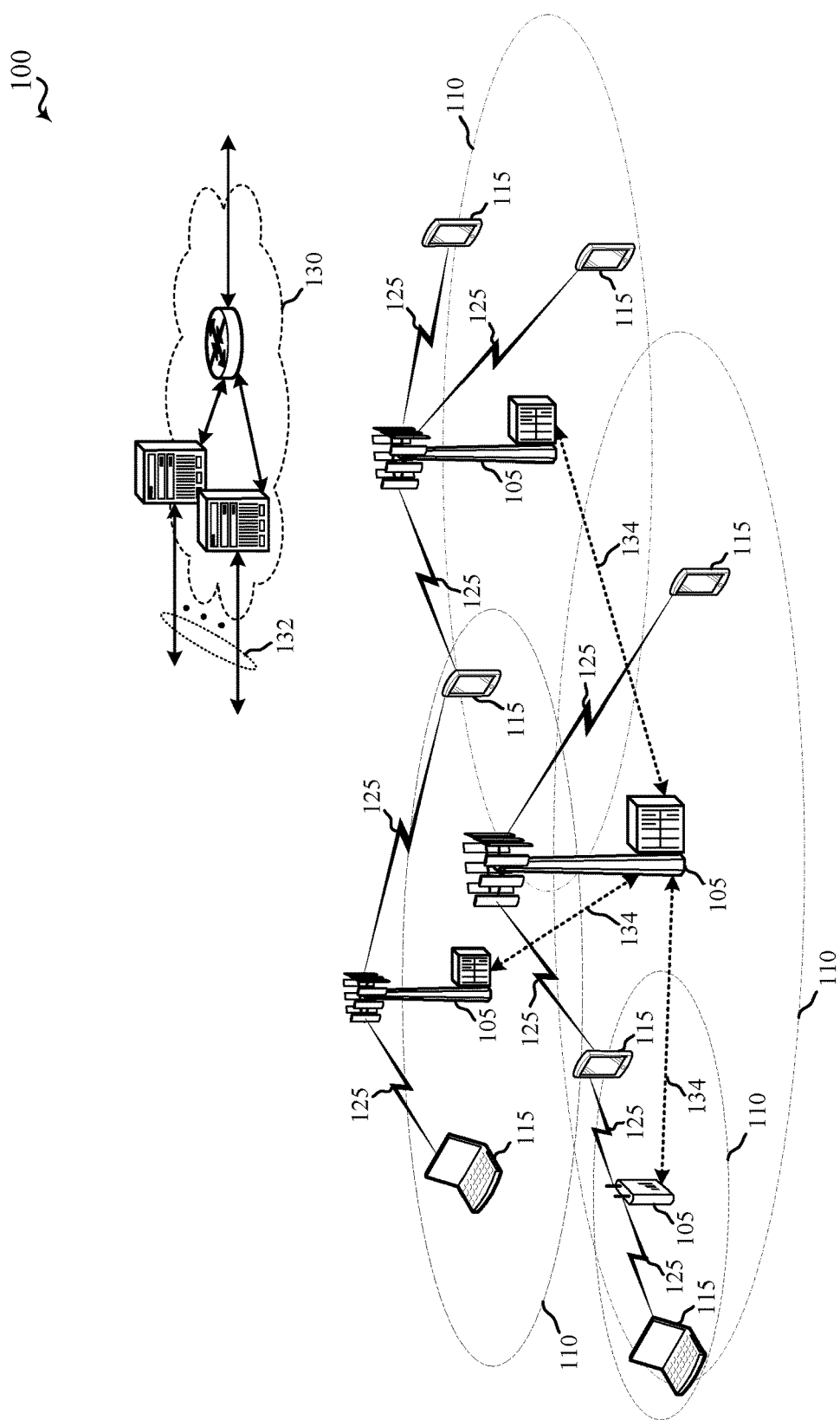
FIG. 1 illustrates an example of a wireless communication system, in accordance with various aspects of the present disclosure.

FIG. 1 illustrates an example of a wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via at least one base station antenna. Each of the base station 105 sites may provide communication coverage for a respective geographic coverage area 110. In some examples, a base station 105 may be referred to as a base transceiver station, a radio base station, an access point, a radio transceiver, a NodeB, an eNB, a Home NodeB, a Home eNodeB, or some other suitable terminology. The geographic coverage area 110 for a base station 105 may be divided into sectors making up a portion of the coverage area (not shown). The wireless communication system 100 may include base stations 105 that cover different coverage areas (e.g., macro or small cell base stations). There may be overlapping geographic coverage areas 110 for different technologies.

In some examples, the wireless communication system 100 may include an LTE/LTE-A network. In LTE/LTE-A networks, the term eNB may be used to describe the base stations 105 (or entities including one or more base stations 105). The wireless communication system 100 may be a Heterogeneous LTE/LTE-A network in which different eNBs provide coverage for various geographical regions. For example, each eNB or base station 105 may provide communication coverage for a macro cell, a small cell, or others of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., dedicated, shared, etc.) radio frequency spectrums as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A media access control (MAC) layer may perform packet segmentation and reassembly to communicate over logical channels, and may also perform priority handling and multiplexing of logical channels into transport channels. The MAC layer may also use a Hybrid Automatic-Repeat-Request (HARD) process to provide retransmission at the MAC layer to improve link efficiency. In the control plane, a Radio Resource Control (RRC) protocol layer may provide establishment, configuration, and maintenance of an RRC connection between a UE 115 and the base stations 105 or core network 130 supporting radio bearers for the user plane data. At the physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a wireless communication device, a personal computer (e.g., a laptop computer, a netbook computer, a tablet computer, etc.), a handheld device, a cellular telephone, a smart phone, a cordless phone, a wireless modem, a wireless local loop (WLL) station, a personal digital assistant (PDA), a digital video recorder (DVR), an internet appliance, a gaming console, an e-reader, etc. A UE may be able to communicate with various base stations and network equipment, including macro eNBs, small cell eNBs, relay base stations, and the like. A UE may also be able to communicate using different radio access technologies (RATs), such as a cellular RAT (e.g., an LTE/LTE-A RAT), a Wi-Fi RAT, or other RATs.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

Base stations 105 and UEs 115 may communicate over the communication links 125 using carriers, which may also be referred to as component carriers (CCs), layers, channels, etc. The term "component carrier" or CC may refer to each of the multiple carriers utilized by a UE operating in a carrier aggregation (CA) mode, and may be distinct from other portions of system bandwidth. For instance, a CC may be a relatively narrow-bandwidth carrier susceptible of being utilized independently or in combination with other component carriers. Each CC may provide the same capabilities as an isolated carrier based on release 8 or release 9 of the LTE standard. Multiple CCs may be aggregated or utilized concurrently to provide some UEs 115 with greater bandwidth and, e.g., higher data rates. Thus, individual CCs may be backwards compatible with legacy UEs 115 (e.g., UEs 115 implementing LTE release 8 or release 9); while other UEs 115 (e.g., UEs 115 implementing post-release 8/9 LTE versions), may be configured with multiple CCs in a multi-carrier mode. A carrier used for downlink (DL) transmissions may be referred to as a DL CC, and a carrier used for uplink (UL) transmissions may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc.

A UE 115 may communicate with a single base station 105 utilizing multiple carriers, and may also communicate with multiple base stations simultaneously on different carriers. Each cell of a base station 105 may include an UL CC and a DL CC. The coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information (UCI), e.g., acknowledgement (ACK)/negative acknowledgment (NACK), channel quality indicator (CQI), and scheduling information transmitted on a physical uplink control channel (PUCCH), are carried by the PCell. Additional carriers may be designated as secondary carriers, or secondary component carriers (SCC), which may be served by secondary cells (SCells). Secondary cells may likewise be semi-statically configured on a per-UE basis. In some cases, SCells may not include or be configured to transmit the same control information as the PCell.

In some cases, wireless communication system 100 may utilize one or more eCCs. An SCell may, for instance, be an eCC. An eCC may be characterized by one or more features including: wider bandwidth, shorter OFDM symbol duration, shorter transmission time interval (TTIs), and a different over-the-air communication protocol. In some cases, an eCC may be associated with a CA configuration or a dual connectivity configuration (i.e., when multiple serving cells have a suboptimal backhaul link). An eCC may also be configured for use in unlicensed spectrum or shared spectrum (where more than one operator is allowed to use the spectrum). An eCC characterized by wider bandwidth may include one or more segments that may be utilized by UEs 115 that are not capable of monitoring the whole bandwidth or prefer to use a limited bandwidth (e.g., to conserve power).

In some cases, an eCC may utilize a different symbol duration, which may be a reduced symbol duration compared to symbol durations of other CCs. A shorter symbol duration is associated with increased subcarrier spacing. A TTI in eCC may consist of one or multiple symbols. In some cases, the TTI duration (that is, the number of symbols in a TTI) may be variable. In some examples, an eCC may include multiple hierarchical layers associated with different TTI lengths. For example, TTIs at one hierarchical layer may correspond to uniform one millisecond (1 ms) subframes, whereas in a second layer, variable length TTIs may correspond to bursts of short duration. In conjunction with the reduced TTI length, an eCC may utilize dynamic time division duplex (TDD) operation (i.e., it may switch from downlink (DL) to uplink (UL) operation for short bursts according to dynamic conditions).

Wider bandwidth and shorter TTIs may be associated with a modified control channel configuration (e.g., an eCC may utilize an enhanced physical downlink control channel (ePDCCH) for DL control information). For example, one or more control channels of an eCC may utilize frequency division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals.

Figure 2:
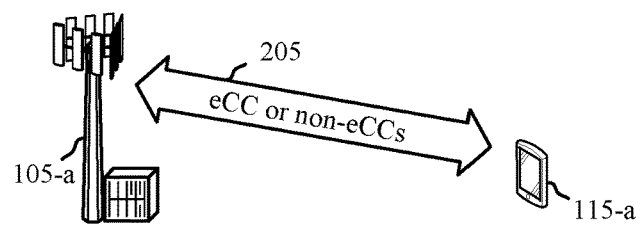
FIG. 2 illustrates an example of a wireless communication system, in accordance with various aspects of the present disclosure.
Figure 2:
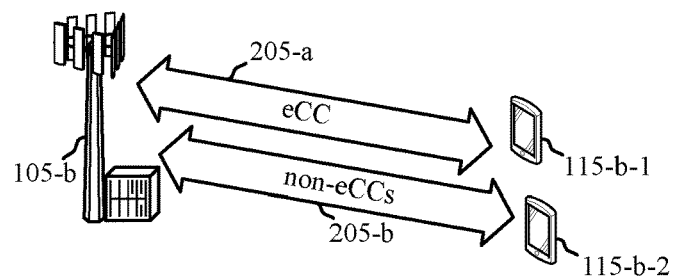
Figure 2:
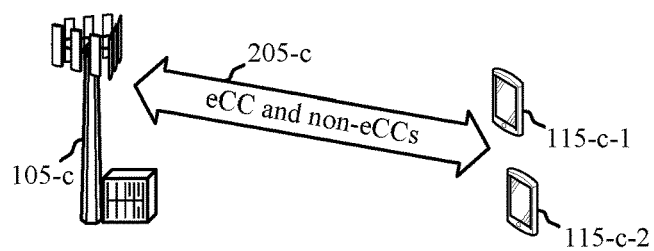

FIG. 2 illustrates an example of a wireless communication system 200, in accordance with various aspects of the present disclosure. The wireless communication system 200 may include a number of base stations 105-a, 105-b, 105-c and a number of UEs 115-a, 115-b-1, 115-b-2, 115-c-1, 115-c-2, which may be examples of aspects of the base stations 105 or UEs 115 described with reference to FIG. 1. In some examples, each of the base stations 105-a, 105-b, and 105-c may communicate with a number of UEs over a shared radio frequency spectrum band. Some or all of the base stations 105-a, 105-b, 105-c may also communicate with UEs over a dedicated radio frequency spectrum band. The shared radio frequency spectrum band may include a radio frequency spectrum band for which transmitting devices may contend for access (e.g., a radio frequency spectrum band that is available for unlicensed use, such as Wi-Fi use, or a radio frequency spectrum band that is available for use by multiple operators in an equally shared or prioritized manner). The dedicated radio frequency spectrum band may include a radio frequency spectrum band for which transmitting devices may not contend for access (e.g., a radio frequency spectrum band licensed to particular users for particular uses, such as a licensed radio frequency spectrum band usable for LTE/LTE-A communications).

By way of example, a first base station 105-a may communicate with a number of UEs, including a first UE 115-a, in a shared channel 205 of the shared radio frequency spectrum band. In some examples, the shared channel 205 may be an 80 MHz channel that includes a 20-80 MHz eCC and up to four 20 MHz non-eCCs. To provide coexistence between eCC communications, non-eCC communications, and possibly communications of other technologies (e.g., Wi-Fi technologies) in the shared channel 205, the base station 105-a may serve eCC capable UEs or non-eCC capable UEs in the shared channel 205. In addition, the base station 105-a may contend for access to the shared channel 205 of the shared radio frequency spectrum band. In some examples, contending for access to the shared channel 205 may include performing a Listen Before Talk (LBT) procedure, such as a clear channel assessment (CCA) procedure or an enhanced clear channel assessment (eCCA) procedure. In some examples, the base station 105-a may contend for access to the shared channel 205 by separately and contemporaneously contending for access to each 20 MHz segment of the shared channel 205. Upon winning contention for access to part, or all, of the shared channel 205, the base station 105-a may communicate with the UE 115-a over the part of the shared channel 205.

By way of further example, a second base station 105-b may communicate with at least one eCC capable UE (e.g., a second UE 115-b-1) and at least one non-eCC capable UE (e.g., a third UE 115-b-2) in respective first and second shared channels of the shared radio frequency spectrum band. In some examples, each of the shared channels 205-a and 205-b may be an 80 MHz channel that includes a 20-80 MHz eCC and up to four 20 MHz non-eCCs. To provide coexistence between eCC communications, non-eCC communications, and possibly communications of other technologies (e.g., Wi-Fi technologies) in the shared channels 205-a and 205-b, the base station 105-b may serve eCC capable UEs on the shared channel 205-a and serve non-eCC capable UEs on the shared channel 205-b. In this manner, a frequency separation may be provided between eCC and non-eCC communications. In addition, the base station 105-*b* may contend for access to the shared channels 205-*a* and 205-*b*. In some examples, contending for access to the shared channels 205-*a* and 205-*b* may include performing an LBT procedure, such as a CCA procedure or an eCCA procedure. In some examples, the base station 105-*b* may contend for access to the shared channels 205-*a* and 205-*b* by separately and contemporaneously contending for access to each 20 MHz segment in the shared channels 205-*a* and 205-*b*. Upon winning contention for access to part or all of a shared channel 205-*a* or 205-*b*, the base station 105-*b* may communicate with the UEs 115-*b*-1 or 115-*b*-2 over the part of the shared channel 205-*a* or 205-*b*.

When communicating with eCC capable UEs and non-eCC capable UEs in the shared channels 205-*a* and 205-*b*, the base station 105-*c* may employ coexistence techniques to avoid channel interference due to radio frequency (RF) leakage (e.g., techniques to reduce adjacent channel leakage power ratios (ACLRs)). The coexistence techniques may include, for example, interference avoidance, mitigation, or cancellation techniques.

By way of further example, a third base station 105-*c* may communicate with at least one eCC capable UE (e.g., a fourth UE 115-*c*-1) and at least one non-eCC capable UE (e.g., a fifth UE 115-*c*-2) in a shared channel 205-*c* of the shared radio frequency spectrum band. In some examples, the shared channel 205-*c* may be an 80 MHz channel that includes a 20-80 MHz eCC and up to four 20 MHz non-eCCs. To provide coexistence between eCC communications, non-eCC communications, and possibly communications of other technologies (e.g., Wi-Fi technologies) in the shared channels 205-*c*, the base station 105-*c* may serve eCC capable UEs and non-eCC capable UEs in a FDM or time division multiplexed (TDM) manner on the shared channel 205-*c*. In this manner, a time separation may be provided between eCC and non-eCC communications. In addition, the base station 105-*c* may contend for access to the shared channel 205-*c*. In some examples, contending for access to the shared channel 205-*c* may include performing an LBT procedure, such as a CCA procedure or an eCCA procedure. In some examples, the base station 105-*c* may contend for access to the shared channel 205-*c* by separately and contemporaneously contending for access to each 20 MHz segment in the shared channel 205-*c*. Upon winning contention for access to part, or all, of the shared channel 205-*c*, the base station 105-*c* may communicate with the UEs 115-*c*-1 and 115-*c*-2 over the part of the shared channel 205-*c*.

Figure 3:
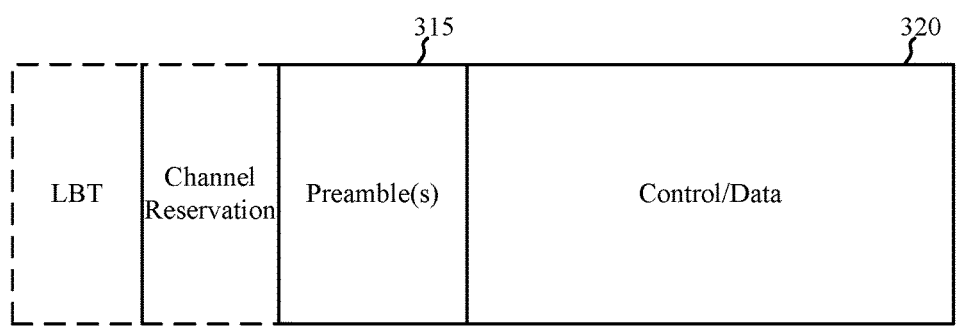
FIG. 3 shows an exemplary structure of a Listen Before Talk (LBT) frame, in accordance with various aspects of the present disclosure.

FIG. 3 shows an exemplary structure of an LBT frame 300, in accordance with various aspects of the present disclosure. In some examples, the LBT frame 300 may be used to define communications in the shared channel 205-*c* described with reference to FIG. 2. The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner). By way of example, the LBT frame may have a bandwidth of 80 MHz, and may serve a 20-80 MHz eCC transmission or from one to four 20 MHz non-eCC transmissions.

The LBT frame 300 may include a preamble portion 315 and a control/data portion 320. The preamble portion 315 may include any number of preambles, which preambles may be understood by different types of devices. For example, the preamble portion 315 may include one or more Wi-Fi preambles, one or more non-eCC preambles (e.g., channel usage beacon signals (CUBS)), or one or more eCC preambles. Similarly, the control/data portion may include control/data portions for non-eCC capable devices, eCC capable devices, or a combination thereof. The preamble may be used to reserve the shared channel until a boundary of the LBT frame 300, and to convey information regarding the control/data portion 320. Exemplary embodiments of the LBT frame 300 are described with reference to FIGS. 4, 5, 6, 7, 8, and 9.

Figure 4:
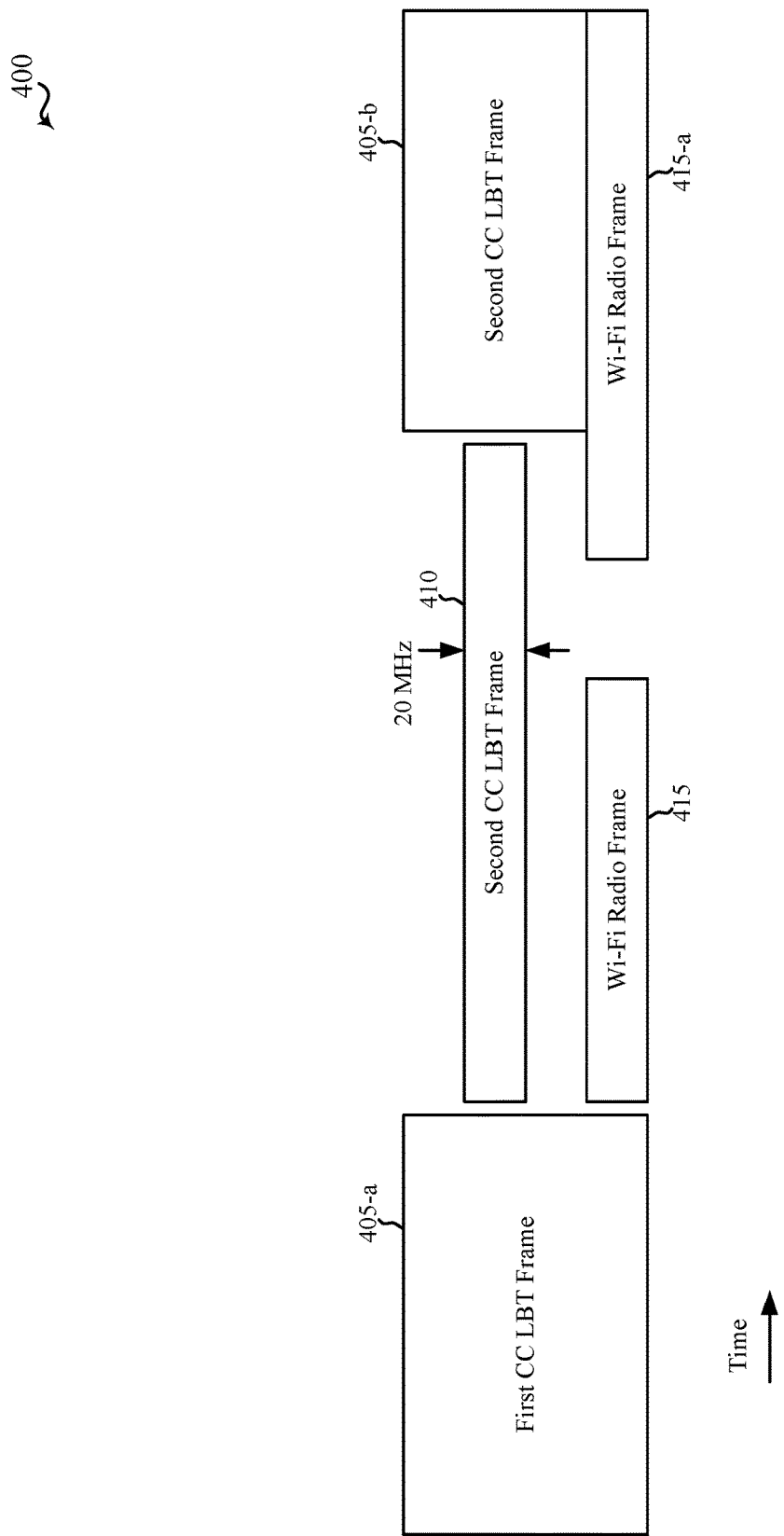
FIG. 4 shows a timing diagram of time division multiplexed (TDM) communication windows, in accordance with various aspects of the present disclosure.

FIG. 4 shows a timing diagram 400 of TDM communication windows, in accordance with various aspects of the present disclosure. The time division multiplexed communication windows may include first CC communication windows (e.g., first CC LBT frames 405) and second CC communication windows (e.g., second CC LBT frames 410). The first CC communication windows and second CC communication windows may be multiplexed in a shared channel of a shared radio frequency spectrum band. In some examples, the communication windows may be used for communication between a base station (e.g., a base station 105 described with reference to FIG. 1 or 2) and one or more UEs (e.g., one or more of the UEs 115 described with reference to FIG. 1 or 2). In some examples, a duration of OFDM symbols of the first CC communication windows may be different from a duration of OFDM symbols of the second CC communication windows.

The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner). By way of example, the shared channel may be an 80 MHz channel, with the first CC communication windows including a 20-80 MHz eCC, and with the second CC communication windows including one to four 20 MHz non-eCCs.

In the timing diagram 400, a base station may contend for access to the shared channel for each of a number of LBT frames 405 or 410. In some examples, contending for access to the shared channel may include performing an LBT procedure, such as a CCA procedure or an eCCA procedure. In some examples, the base station may contend for access to the shared channel by separately and contemporaneously contending for access to each 20 MHz segment. By way of example, the timing diagram 400 shows a base station winning contention for access to the full bandwidth of the shared channel for a first LBT frame 405-*a*, but winning contention for access to a part of the bandwidth of the shared channel in a second LBT frame 410 and a third LBT frame 405-*b*. In some cases, the base station may fail to win access to one or more 20 MHz segments of the shared channel because of Wi-Fi activity (e.g., Wi-Fi radio frames 415 and 415-*a*) on the 20 MHz segment(s).

In some embodiments, a base station may configure a LBT frame based at least in part on a type of traffic to be scheduled in the LBT frame (e.g., first CC traffic for transmission to first CC capable UEs or second CC traffic for transmission to second CC capable UEs) or based at least in part on the types of UEs served by the base station (e.g., based at least in part on the numbers of first CC capable UEs and second CC capable UEs served by the base station). In other embodiments, the base station may configure a LBT frame based on a static or semi-static time domain sequence of communication windows (e.g., a sequence of first CC communication windows and second CC communication windows). In either case, first CC communication windows and second CC communication windows may be time division multiplexed at a LBT frame level (e.g., a packet level).

The first CC communication windows and second CC communication windows multiplexed in the shared channel may be scheduled to carry downlink transmissions or uplink transmissions.

In some embodiments, the duration of the first CC communication windows (or first CC LBT frames 405) may differ from the duration of the second CC communication windows (or second CC LBT frames 410). In some embodiments, the durations of different first CC communication windows (or first CC LBT frames 405) may differ, or the durations of different second CC communication windows (or second CC LBT frames 410) may differ.

Figure 5A:
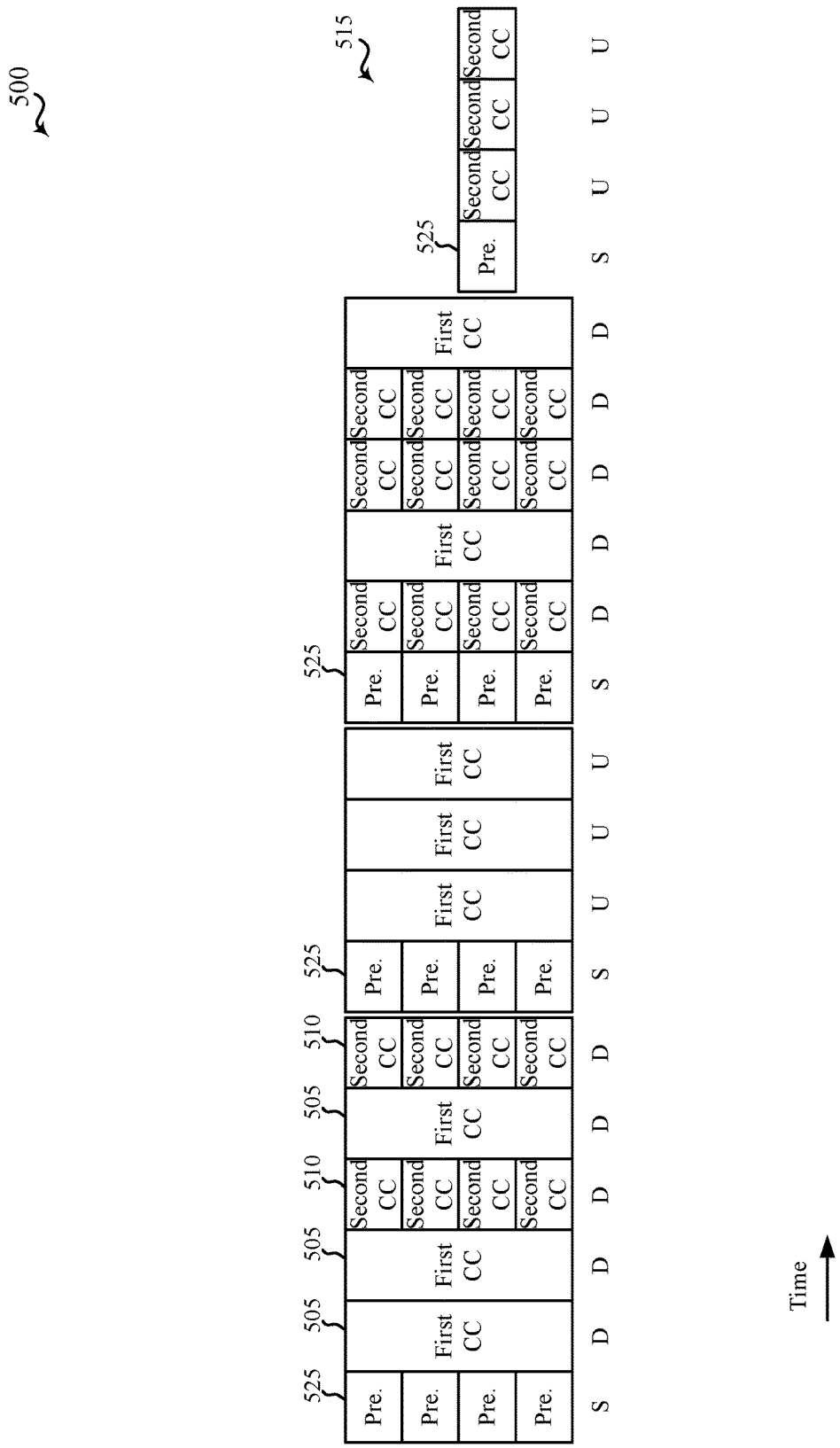
FIG. 5A shows a timing diagram of TDM communication windows, in accordance with various aspects of the present disclosure.

FIG. 5A shows a timing diagram 500 of TDM communication windows, in accordance with various aspects of the present disclosure. The time division multiplexed communication windows may include first CC communication windows 505 and second CC communication windows 510. The first CC communication windows and second CC communication windows may be multiplexed in a shared channel 515 of a shared radio frequency spectrum band. In some examples, the communication windows may be used for communication between a base station (e.g., a base station 105 described with reference to FIG. 1 or 2) and one or more UEs (e.g., one or more of the UEs 115 described with reference to FIG. 1 or 2). In some examples, a duration of OFDM symbols of the first CC communication windows may be different from a duration of OFDM symbols of the second CC communication windows.

The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner). By way of example, the channel 515 may be an 80 MHz channel, with the first CC communication windows 505 including a 20-80 MHz eCC, and with the second CC communication windows 510 including one to four 20 MHz non-eCCs.

In the timing diagram 500, a base station may contend for access to the shared channel 515 for each of a number of LBT frames (e.g., each group of communication windows following transmission of a preamble 525). In some examples, contending for access to the shared channel 515 may include performing an LBT procedure, such as a CCA procedure or an eCCA procedure. In some examples, the base station may contend for access to the shared channel 515 by separately and contemporaneously contending for access to each 20 MHz segment. In some cases, the base station may fail to win access to one or more 20 MHz segments of the first shared channel 515 or the second shared channel 520 because of Wi-Fi activity on the 20 MHz segment(s).

In some examples, and as shown, a second CC uplink may be provided using a single 20 MHz segment. In other examples, the second CC uplink may be provided using additional 20 MHz segments.

In some embodiments, a base station may configure a LBT frame of the shared channel 515 based at least in part on a type of traffic to be scheduled in the LBT frame (e.g., first CC traffic for transmission to first CC capable UEs, second CC traffic for transmission to second CC capable UEs, or a combination thereof) or based at least in part on the types of UEs served by the base station (e.g., based at least in part on the numbers of first CC capable UEs and second CC capable UEs served by the base station). In other embodiments, the base station may configure a LBT frame of the shared channel 515 based on a static or semi-static time domain sequence of communication windows (e.g., a sequence of first CC communication windows 505 and second CC communication windows 510). In either case, first CC communication windows 505 and second CC communication windows 510 may be time division multiplexed at a LBT frame level or lower (e.g., within a LBT frame).

When time division multiplexing of communication windows is performed within a LBT frame, as shown in FIG. 5A, partitioning between the first CC communication windows 505 and the second CC communication windows 510 may be signaled in a control channel (e.g., a physical frame format indicator channel (PFFICH)) of a LBT frame. Alternatively, partitioning between the first CC communication windows 505 and the second CC communication windows 510 may be indicated by transmitting, to one or more first CC capable UEs, one or more grants of resources for first CC communications (e.g., one or more grants including at least a first grant). In some examples, the partitioning may also be indicated by transmitting, to one or more second CC capable UEs, one or more grants of resources for second CC communications (e.g., one or more grants including at least a second grant).

Figure 5B:
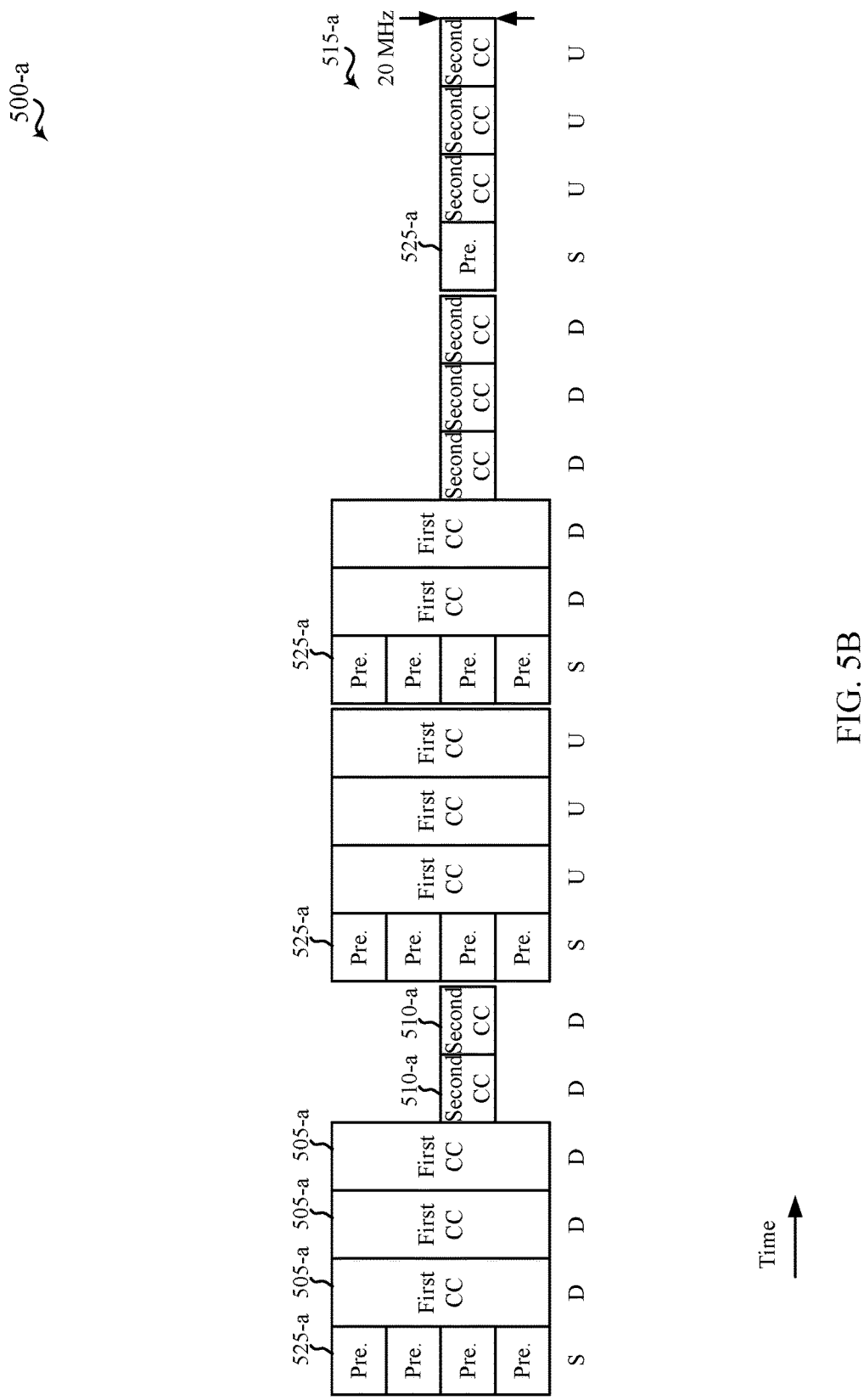
FIG. 5B shows a timing diagram of TDM communication windows, in accordance with various aspects of the present disclosure.

FIG. 5B shows a timing diagram 500-*a* of TDM communication windows, in accordance with various aspects of the present disclosure. The time division multiplexed communication windows may include first CC communication windows 505-*a* and second CC communication windows 510-*a*. The first CC communication windows and second CC communication windows may be multiplexed in a shared channel 515-*a* of a shared radio frequency spectrum band. In some examples, the communication windows may be used for communication between a base station (e.g., a base station 105 described with reference to FIG. 1 or 2) and one or more UEs (e.g., one or more of the UEs 115 described with reference to FIG. 1 or 2). In some examples, a duration of OFDM symbols of the first CC communication windows may be different from a duration of OFDM symbols of the second CC communication windows.

The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner). By way of example, the channel 515-*a* may be an 80 MHz channel, with the first CC communication windows 505-*a* including a 20-80 MHz eCC, and with the second CC communication windows 510-*a* including one to four 20 MHz non-eCCs.

In the timing diagram 500-*a*, a base station may contend for access to the shared channel 515-*a* for each of a number of LBT frames (e.g., each group of communication windows following transmission of a preamble 525-*a*). In some examples, contending for access to the shared channel 515-*a* may include performing an LBT procedure, such as a CCA procedure or an eCCA procedure. In some examples, the base station may contend for access to the shared channel 515-*a* by separately and contemporaneously contending for access to each 20 MHz segment. In some cases, the base station may fail to win access to one or more 20 MHz segments of the first shared channel 515-*a* or the second shared channel 520-*a* because of Wi-Fi activity on the 20 MHz segment(s).

In some examples, and as shown, a second CC uplink and second CC downlink may be provided using a single 20 MHz segment. In other examples, the second CC uplink or second CC downlink may be provided using additional 20 MHz segments.

In some embodiments, a base station may configure an LBT frame of the shared channel 515-*a* based at least in part on a type of traffic to be scheduled in the LBT frame (e.g., first CC traffic for transmission to first CC capable UEs, second CC traffic for transmission to second CC capable UEs, or a combination thereof) or based at least in part on the types of UEs served by the base station (e.g., based at least in part on the numbers of first CC capable UEs and second CC capable UEs served by the base station). In other embodiments, the base station may configure an LBT frame of the shared channel 515-*a* based on a static or semi-static time domain sequence of communication windows (e.g., a sequence of first CC communication windows 505-*a* and second CC communication windows 510-*a*). In either case, first CC communication windows 505-*a* and second CC communication windows 510-*a* may be time division multiplexed at an LBT frame level or lower (e.g., within an LBT frame).

When time division multiplexing of communication windows is performed within an LBT frame, as shown in FIG. 5B, partitioning between the first CC communication windows 505-*a* and the second CC communication windows 510-*a* may be signaled in a control channel (e.g., a physical frame format indicator channel (PFFICH)) of an LBT frame. Alternatively, partitioning between the first CC communication windows 505-*a* and the second CC communication windows 510-*a* may be indicated by transmitting, to one or more first CC capable UEs, one or more grants of resources for first CC communications (e.g., one or more grants including at least a first grant). In some examples, the partitioning may also be indicated by transmitting, to one or more second CC capable UEs, one or more grants of resources for second CC communications (e.g., one or more grants including at least a second grant).

Figure 6:
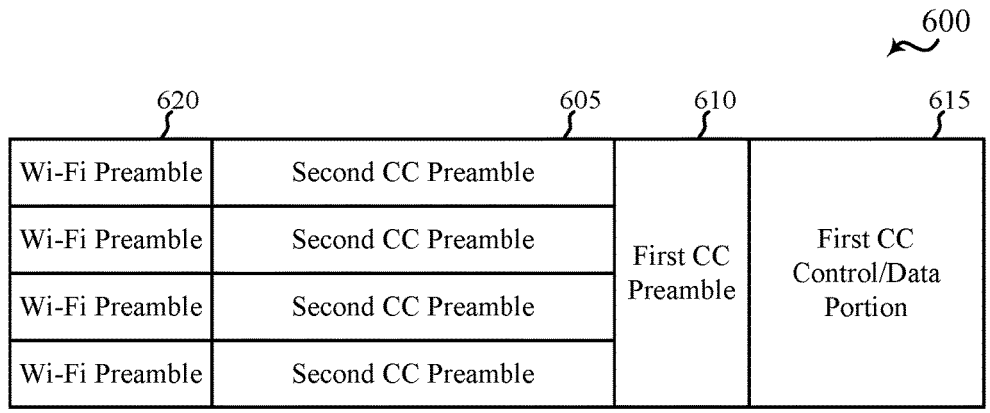
FIG. 6 shows an exemplary structure of an LBT frame, in accordance with various aspects of the present disclosure.

FIG. 6 shows an exemplary structure of an LBT frame 600, in accordance with various aspects of the present disclosure. In some examples, the LBT frame 600 may be an example of one or more of the first CC LBT frames described with reference to FIG. 4 or 5 and may be transmitted in a shared channel of a shared radio frequency spectrum band. The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner). By way of example, the shared channel may be an 80 MHz channel, with the first CC communication windows including a 20-80 MHz eCC, and with the second CC communication windows including one to four 20 MHz non-eCCs.

In some examples, the LBT frame 600 may include a second CC preamble portion 605 (e.g., a portion including a second CC preamble transmitted per 20 MHz carrier or narrow-band channel), a first CC preamble portion 610 (e.g., a portion including a first CC preamble transmitted per 80 MHz carrier or wide-band channel), and a first CC control/data portion 615 (e.g., a portion including a first CC control/data portion transmitted per 80 MHz carrier or wide-band channel). The second CC preamble portion 605 may precede the first CC preamble portion 610, and the first CC preamble portion 610 may precede the first CC control/data portion 615. In some embodiments, the second CC preamble portion 605 may include an optional Wi-Fi preamble portion 620. The Wi-Fi preamble portion 620 may precede the remainder of the second CC preamble portion 605. In some examples, one or more second CC preambles included in the second CC preamble portion 605 may include an indication that the LBT frame 600 is configured as a first CC LBT frame. In some examples, the indication may include a scrambling, a PLMN ID, a cell ID, control signaling (e.g., a value in a PFFICH), a sequence, or a combination thereof. The scrambling may be a scrambling of part or all of a second CC preamble, and may distinguish the first CC LBT frame from a second CC LBT frame. Similarly, the PLMN ID, cell ID, control signaling, sequence, or a combination thereof may distinguish the first CC LBT frame from a second CC LBT frame. In some embodiments, a sequence may be used to indicate that the LBT frame 600 is a first CC LBT frame, and to also differentiate different PLMNs (e.g., a serving PLMN or other PLMN). When a second CC preamble does not include an indication that the LBT frame 600 is a first CC LBT frame, a UE may identify the LBT frame 600 as a first CC LBT frame by, for example, decoding a control channel transmitted in the first CC preamble portion 610 or the first CC control/data portion 615.

The LBT frame 600 may be scheduled for a downlink transmission or an uplink transmission. The LBT frame 600 can be useful in that it enables UEs that are second CC capable but not first CC capable to decode the second CC preamble portion 605 and defer access to the shared channel when the shared channel is used for transmission of a first CC LBT frame. Also, a UE's ability to decode the second CC preamble portion 605 may better enable the UE to defer access to the shared channel (e.g., compared to a deferral based on energy detection on the shared channel). In some examples, the second CC may be an older or legacy deployment CC (e.g., an LTE/LTE-A CC deployed over a radio frequency spectrum band shared with unlicensed users, such as Wi-Fi users), and the first CC may be a newer deployment CC (e.g., an eCC). Legacy deployment UEs may understand information carried on the second CC but not the first CC. Newer deployment UEs may understand information carried on both the first CC and the second CC. A base station that wants to serve both types of UEs may transmit the second CC preamble in both second CC LBT frames and first CC LBT frames so that legacy deployment UEs may understand the preamble, and information carried in the preamble, regardless of whether the legacy deployment UEs can understand the first CC LBT frames as a whole. Likewise, transmitting a Wi-Fi preamble enables Wi-Fi devices to understand the preamble, and information carried in the preamble. In particular, the preamble may carry information on the length of a transmission, which length information may enable non-intended receivers of a transmission, including legacy deployment UEs, to defer access to the medium using virtual carrier sense.

FIG. 6 assumes that a base station has won contention for access to the full 80 MHz bandwidth of the shared channel. In some examples, a base station may only win contention for access to a part of the bandwidth (i.e., some but not all of the 20 MHz segments), in which case the base station may transmit a second CC preamble portion and schedule a first CC communication window over the part of the bandwidth that it has access to.

Figure 7:
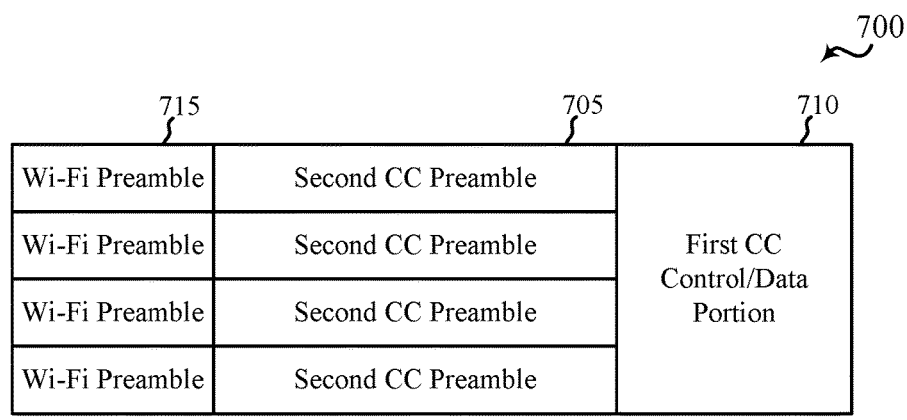
FIG. 7 shows another exemplary structure of an LBT frame, in accordance with various aspects of the present disclosure.

FIG. 7 shows another exemplary structure of an LBT frame 700, in accordance with various aspects of the present disclosure. In some examples, the LBT frame 700 may be an example of one or more of the first CC LBT frames described with reference to FIG. 4 or 5, and may be transmitted in a shared channel of a shared radio frequency spectrum band. The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner). By way of example, the shared channel may be an 80 MHz channel, with the first CC communication windows including a 20-80 MHz eCC, and with the second CC communication windows including one to four 20 MHz non-eCCs.

In some examples, the LBT frame may include a second CC preamble portion 705 and a first CC control/data portion 710. The second CC preamble portion 705 may precede the first CC control/data portion 710. In some embodiments, the second CC preamble portion 705 may include an optional Wi-Fi preamble portion 715. The Wi-Fi preamble portion 715 may precede the remainder of the second CC preamble portion 705. In some examples, one or more second CC preambles included in the second CC preamble portion 705 may include an indication that the LBT frame is configured as a first CC LBT frame. In some examples, the indication may include a scrambling, a PLMN ID, a cell ID, control signaling (e.g., a value in a PFFICH), a sequence, or a combination thereof. The scrambling may be a scrambling of part or all of a second CC preamble, and may distinguish the first CC LBT frame from a second CC LBT frame. Similarly, the PLMN ID, cell ID, control signaling, sequence, or a combination thereof may distinguish the first CC LBT frame from a second CC LBT frame. In some embodiments, a sequence may be used to indicate that the LBT frame 700 is a first CC LBT frame, and to also differentiate different PLMNs (e.g., a serving PLMN or other PLMN). When the second CC preamble does not include an indication that the LBT frame 700 is a first CC LBT frame, a UE may identify the LBT frame 700 as a first CC LBT frame by, for example, decoding a control channel transmitted in the first CC preamble or first CC control/data portion 710.

The LBT frame 700 may be scheduled for a downlink transmission or an uplink transmission. The LBT frame 700 can be useful in that it enables UEs that are second CC capable but not first CC capable to decode the second CC preamble portion 705 and defer access to the shared channel when the shared channel is used for transmission of a first CC LBT frame. A UE's ability to decode the second CC preamble portion 705 may better enable the UE to defer access to the shared channel (e.g., compared to a deferral based on energy detection on the shared channel). Because the LBT frame 700 does not include a first CC preamble portion, a UE receiving the LBT frame 700 may obtain a channel estimation for the shared channel from the second CC preamble portion 705.

FIG. 7 assumes that a base station has won contention for access to the full bandwidth of the shared channel. In some examples, a base station may only win contention for access to a part of the bandwidth, in which case the base station may transmit a second CC preamble portion and schedule a first CC communication window over the part of the bandwidth that it has access to.

Figure 8:
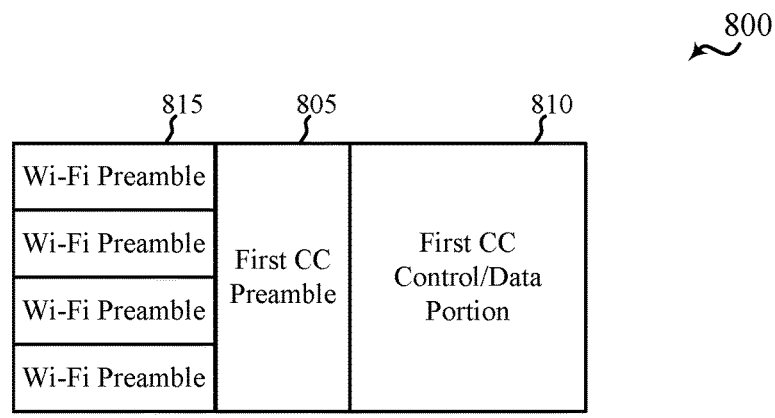
FIG. 8 shows an exemplary structure of an LBT frame, in accordance with various aspects of the present disclosure.

FIG. 8 shows an exemplary structure of an LBT frame 800, in accordance with various aspects of the present disclosure. In some examples, the LBT frame 800 may be an example of one or more of the first CC LBT frames described with reference to FIG. 4 or 5, and may be transmitted in a shared channel of a shared radio frequency spectrum band. The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner). By way of example, the shared channel may be an 80 MHz channel, with the first CC communication windows including a 20-80 MHz eCC, and with the second CC communication windows including one to four 20 MHz non-eCCs.

In contrast to the LBT frame 600 or 700 described with reference to FIG. 6 or 7, the LBT frame 800 does not include a second CC preamble portion. Instead, the LBT frame 800 includes a first CC preamble portion 805 and a first CC control/data portion 810. The first CC preamble portion 805 may precede the first CC control/data portion 810. In some embodiments, the first CC preamble portion 805 may include an optional Wi-Fi preamble portion 815. The Wi-Fi preamble portion 815 may precede the remainder of the first CC preamble portion 805.

UEs that are second CC capable but not first CC capable may not understand the first CC preamble portion 805. However, these UEs may defer access to the shared channel based on energy detection.

The LBT frame 800 may be scheduled for a downlink transmission or an uplink transmission. The LBT frame 800 can be useful in that it may have lower overhead than the LBT frame 600 or 700 described with reference to FIG. 6 or 7.

In some cases, a base station may broadcast a DRS (e.g., a DRS including a primary synchronization signal (PSS) or a secondary synchronization signal (SSS)) in each of a plurality of discovery time periods (e.g. in each of a plurality of discovery signals measurement timing configuration (DMTC) windows). The DRSs may be used by UEs for acquisition or measurement purposes. In some examples, the DRSs may contain a physical broadcast channel (PBCH). Additionally or alternatively, the DRSs may contain an enhanced system information block (eSIB). In some examples, the DRSs may be broadcast in a shared channel of a shared radio frequency spectrum band after winning contention for access to part, or all, of the shared channel. The discovery reference signals may also or alternatively be broadcast in the shared channel without contending for access to the shared channel (e.g., in a plurality of CCA-exempt time periods).

In some cases, a base station may broadcast a first CC DRS in each of a plurality of discovery time periods. In some examples, a base station may broadcast a second CC DRS in each of a plurality of discovery time periods. In some examples, a base station may broadcast a first CC DRS or a second CC DRS in each of a plurality of discovery time periods. In some examples, a base station may broadcast a first CC DRS and a second CC DRS in each of a plurality of discovery time periods. In some examples, a base station may broadcast a first CC DRS in each of a plurality of first CC discovery time periods, and broadcast a second CC DRS in each of a plurality of second CC discovery time periods.

A base station may in some cases choose to transmit first CC DRSs, second CC DRSs, or a combination thereof based on the types of UEs it serves. For example, when a base station only serves first CC capable UEs, the base station may choose to transmit a first CC DRS in each of a plurality of DRS periods, or the base station may choose to transmit first CC DRSs more frequently than second CC DRSs.

In some examples, a DRS may be broadcast on a 20 MHz segment designated as a primary segment. In other examples, a DRS may be broadcast according to a DRS hopping sequence (e.g., the DRS may be broadcast over different segments in different discovery time periods).

In some cases, an indication of support for first CC communications (e.g., an indication of support for first CC communications by a base station) may be broadcast in a second CC DRS. In some cases, the first CC DRS may include an eCC DRS and the second CC DRS may include a non-eCC DRS.

When a UE receives a first CC DRS broadcast by a base station, the UE may acquire a first CC cell of the base station and engage in first CC communications with the base station, if the UE is capable of first CC communications. Similarly, when a UE receives a second CC DRS broadcast by a base station, the UE may acquire a second CC cell of the base station and engage in second CC communications with the base station, if capable of second CC communications. In addition, a UE that acquires a second CC cell of a base station may in some cases determine that the base station supports first CC communications. In some examples, the UE may determine that the base station supports first CC communications by receiving, in the second CC DRS, an indication that the base station supports first CC communications. In some examples, the UE may determine that the base station supports first CC communications upon receiving second CC configuration information from the base station (e.g., after acquiring the second CC cell of the base station). In some examples, the UE may determine that the base station supports first CC communications upon receiving a first CC DRS from the base station.

Upon determining the base station supports first CC communications, the UE may optionally acquire a first CC cell of the base station and/or otherwise communicate with the base station using first CC communications.

Figure 9:
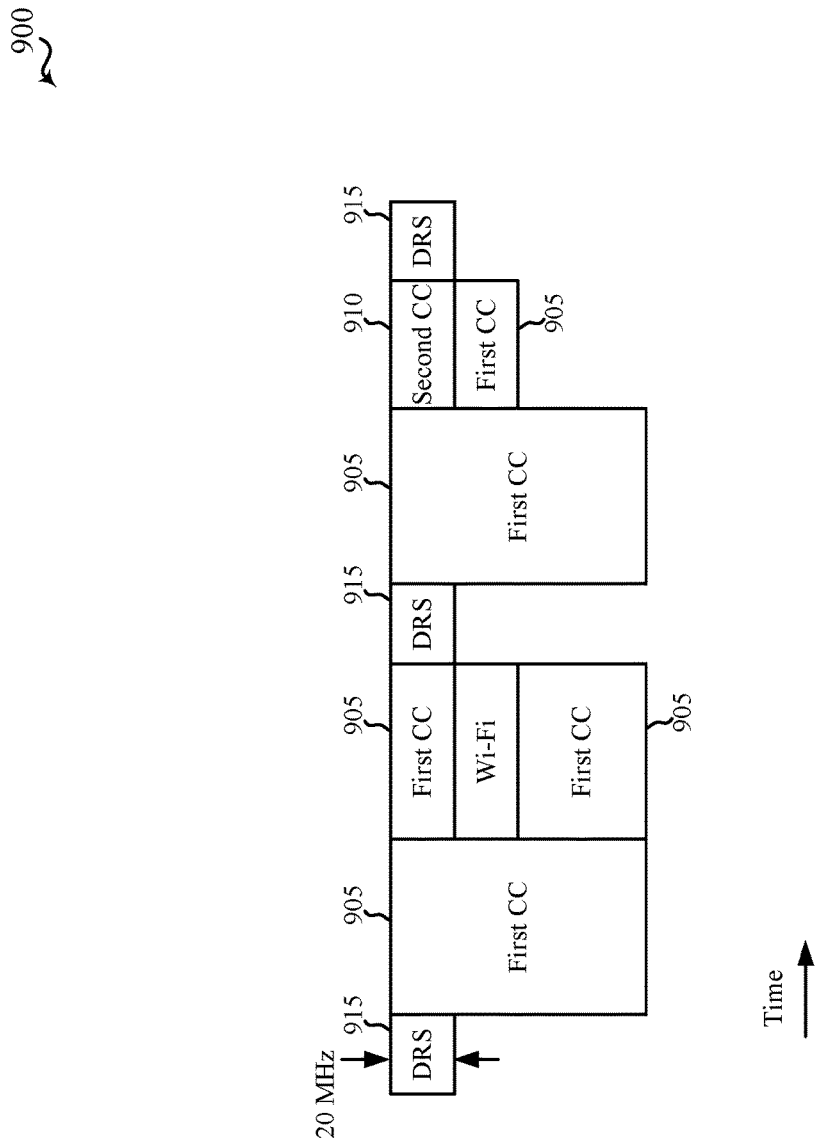
FIG. 9 shows a timing diagram of time division multiplexed communication windows, in accordance with various aspects of the present disclosure.

FIG. 9 shows a timing diagram 900 of time division multiplexed communication windows, in accordance with various aspects of the present disclosure. The time division multiplexed communication windows may include first CC communication windows 905 and second CC communication windows 910. The first CC communication windows 905 and second CC communication windows 910 may be multiplexed in a shared channel of a shared radio frequency spectrum band. In some examples, the communication windows 905 and 910 may be used for communication between a base station (e.g., a base station 105 described with reference to FIG. 1 or 2) and one or more UEs (e.g., one or more of the UEs 115 described with reference to FIG. 1 or 2). In some examples, a duration of OFDM symbols of the first CC communication windows 905 may be different from a duration of OFDM symbols of the second CC communication windows 910.

The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner). By way of example, the shared channel may be an 80 MHz channel, with the first CC communication windows including a 20-80 MHz eCC, and with the second CC communication windows including one to four 20 MHz non-eCCs.

During a plurality of DRS periods 915, the base station may broadcast a plurality of DRS CCs. In some examples, a DRS period 915 may include a first CC DRS, a second CC DRS, or a combination thereof. In some examples, the first CC DRS may include at least one eCC DRS and the second CC DRS may include at least one non-eCC DRS. Although the DRSs are shown to be broadcast over a single 20 MHz segment, the DRSs may alternatively be broadcast according to a DRS hopping sequence. When a UE receives a first CC DRS, the UE may acquire a first CC cell of the base station. When a UE receives a second CC DRS, the UE may acquire a second CC cell of the base station. However, subsequent to acquiring the second CC cell, the UE may determine that the base station is capable of first CC communications (e.g., as previously described). Upon determining the base station supports first CC communications, the UE may optionally acquire a first CC cell of the base station and/or otherwise communicate with the base station using first CC communications. In some embodiments, the UE may switch between receive modes. For example, the UE may use OFDM numerology of a second CC while receiving a second CC DRS and use OFDM numerology of a first CC while communicating with the base station using first CC communications.

Figure 10:
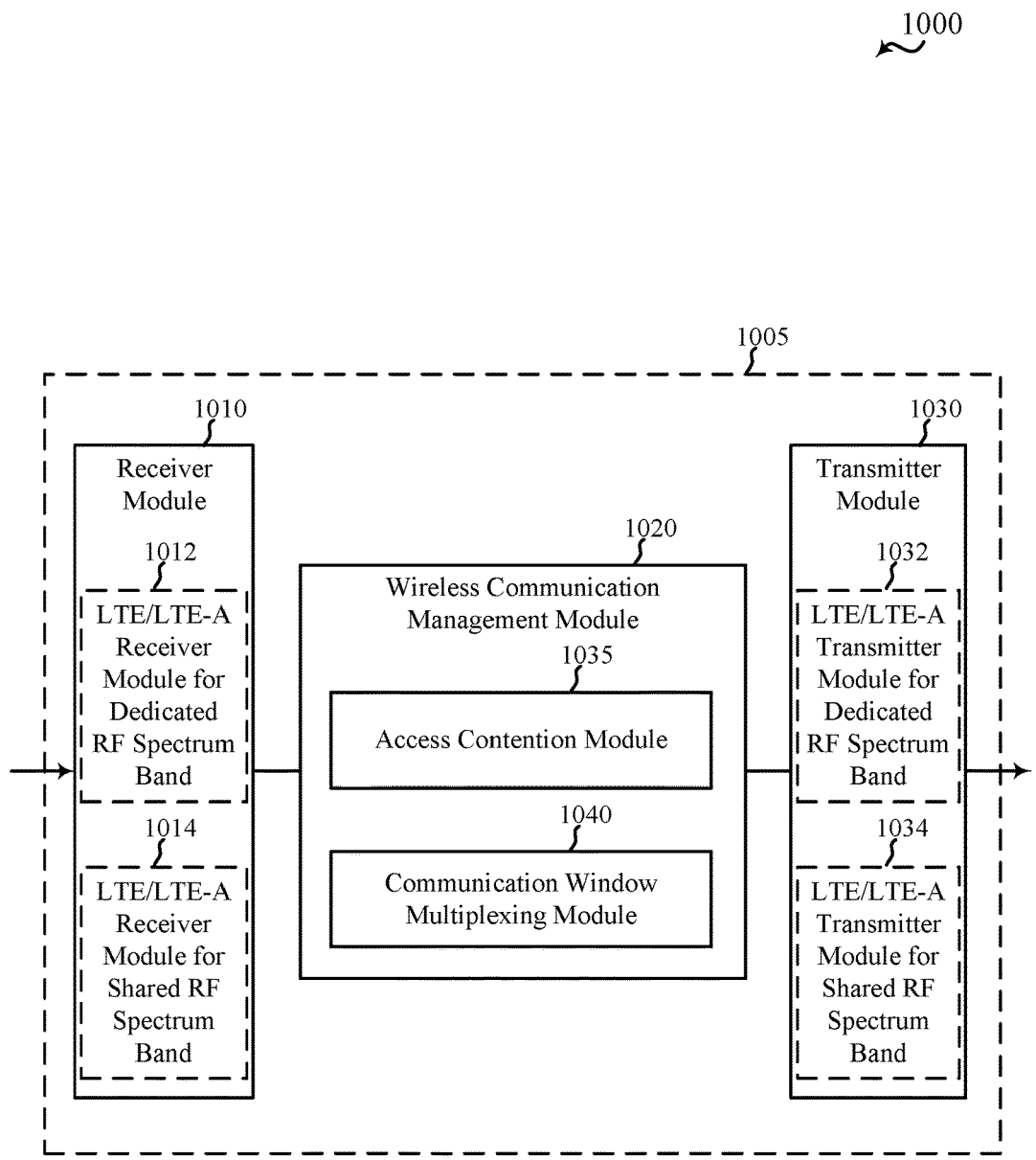
FIG. 10 shows a block diagram of a device for use in wireless communication at a base station, in accordance with various aspects of the present disclosure.

FIG. 10 shows a block diagram 1000 of a device 1005 for use in wireless communication at a base station, in accordance with various aspects of the present disclosure. The device 1005 may be an example of aspects of one or more of the base stations 105 described with reference to FIG. 1 or 2. The device 1005 may also be or include a processor. The device 1005 may include a receiver module 1010, a wireless communication management module 1020, or a transmitter module 1030. Each of these modules may be in communication with each other.

The modules of the device 1005 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, others of integrated circuits may be used (e.g., Structured/Platform ASICs, Field Programmable Gate Arrays (FPGAs), a System on Chip (SoC), and/or others of Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1010 may include at least one radio frequency (RF) receiver, such as at least one RF receiver operable to receive transmissions over a dedicated radio frequency spectrum band (e.g., a radio frequency spectrum band for which transmitting devices may not contend for access because the radio frequency spectrum band is licensed to particular users for particular uses (e.g., a licensed radio frequency spectrum band usable for LTE/LTE-A communications)) or a shared radio frequency spectrum band (e.g., a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner)).

In some examples, the dedicated radio frequency spectrum band or the shared radio frequency spectrum band may be used for LTE/LTE-A communications, as described, for example, with reference to FIG. 1 or 2. The receiver module 1010 may in some cases include separate receivers for the dedicated radio frequency spectrum band and the shared radio frequency spectrum band. The separate receivers may, in some examples, take the form of an LTE/LTE-A receiver module for communicating over the dedicated radio frequency spectrum band (e.g., LTE/LTE-A receiver module for dedicated RF spectrum band 1012), and an LTE/LTE-A receiver module for communicating over the shared radio frequency spectrum band (e.g., LTE/LTE-A receiver module for shared RF spectrum band 1014). The receiver module 1010, including the LTE/LTE-A receiver module for dedicated RF spectrum band 1012 or the LTE/LTE-A receiver module for shared RF spectrum band 1014, may be used to receive various data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter module 1030 may include at least one RF transmitter, such as at least one RF transmitter operable to transmit over the dedicated radio frequency spectrum band or the shared radio frequency spectrum band. The transmitter module 1030 may in some cases include separate transmitters for the dedicated radio frequency spectrum band and the shared radio frequency spectrum band. The separate transmitters may, in some examples, take the form of an LTE/LTE-A transmitter module for communicating over the dedicated radio frequency spectrum band (e.g., LTE/LTE-A transmitter module for dedicated RF spectrum band 1032), and an LTE/LTE-A transmitter module for communicating over the shared radio frequency spectrum band (e.g., LTE/LTE-A transmitter module for shared RF spectrum band 1034). The transmitter module 1030, including the LTE/LTE-A transmitter module for dedicated RF spectrum band 1032 or the LTE/LTE-A transmitter module for shared RF spectrum band 1034, may be used to transmit various data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication management module 1020 may be used to manage one or more aspects of wireless communication for the device 1005. In some examples, the wireless communication management module 1020 may include an access contention module 1035 or a communication window multiplexing module 1040.

The access contention module 1035 may be used to contend for access to a shared channel of the shared radio frequency spectrum band. In some examples, the access contention module 1035 may contend for access to the shared radio frequency spectrum band by performing an LBT procedure, such as a CCA procedure or an eCCA procedure.

The communication window multiplexing module 1040 may be used to multiplex first CC communication windows and second CC communication windows in the shared channel. In some examples, a duration of OFDM symbols of the first CC communication windows may be different from a duration of OFDM symbols of the second CC communication windows. The multiplexing may occur on the shared channel upon the access contention module 1035 winning contention for access to the shared channel. In some examples, the first CC communication windows may include at least one eCC (e.g., one eCC), and the second CC communication windows may include at least one non-eCC (e.g., four non-eCCs).

In some examples of the device 1005, the multiplexing performed by the communication window multiplexing module 1040 may include frequency domain multiplexing the first CC communication windows and the second CC communication windows in the shared channel. In some examples, the multiplexing performed by the communication window multiplexing module 1040 may include time division multiplexing the first CC communication windows and the second CC communication windows in the shared channel. The time division multiplexing may be performed, for example, at a radio frame level or lower (e.g., within a radio frame). In some time division multiplexing examples, the communication window multiplexing module 1040 may signal partitioning between the first CC communication windows and the second CC communication windows in a control channel of a radio frame. Alternatively, partitioning between the first CC communication windows and the second CC communication windows may be indicated by transmitting, to one or more first CC capable UEs, one or more grants of resources for first CC communications (e.g., one or more grants including at least a first grant). In some examples, the partitioning may also be indicated by transmitting, to one or more second CC capable UEs, one or more grants of resources for second CC communications (e.g., one or more grants including at least a second grant).

Figure 11:
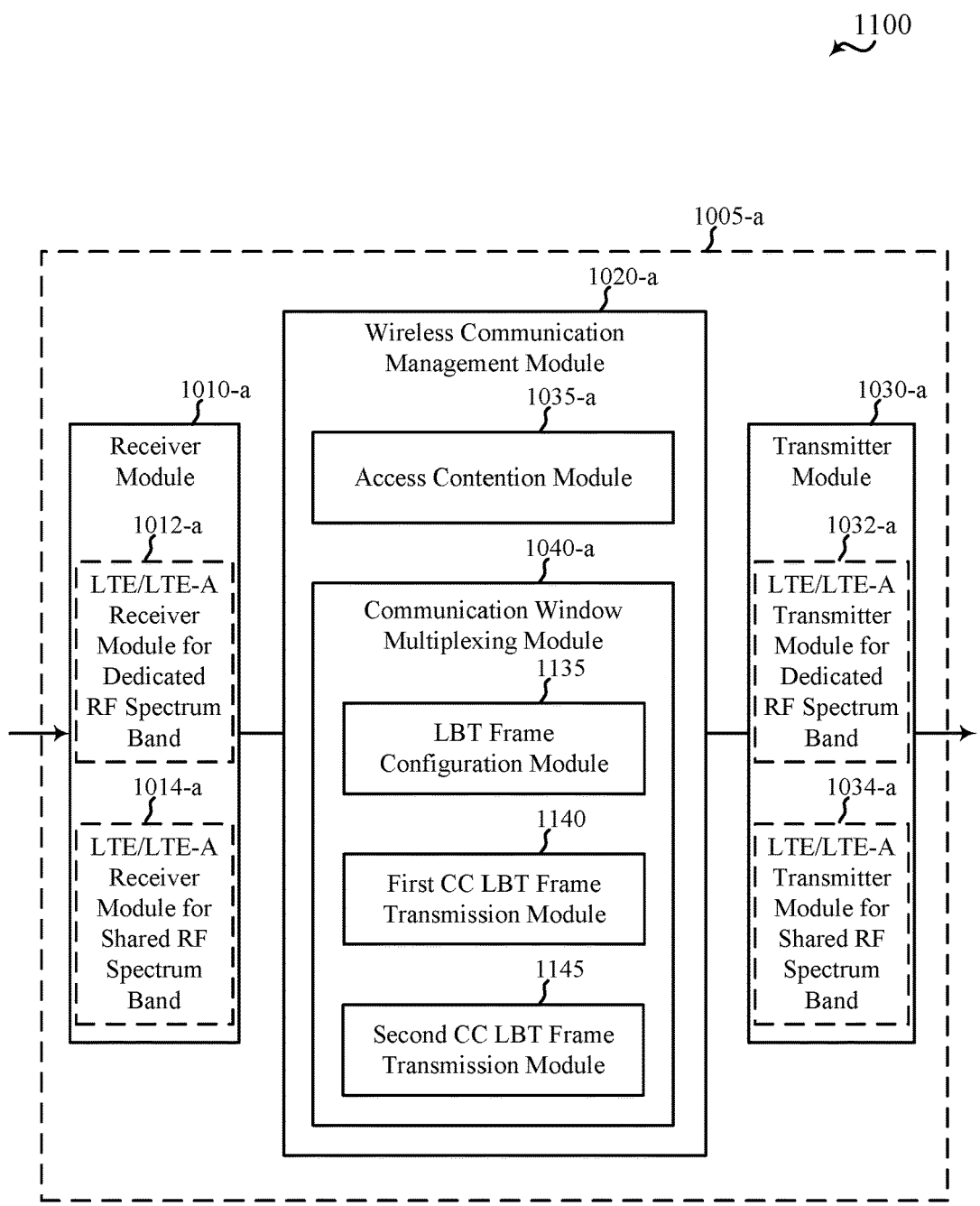
FIG. 11 shows a block diagram of a device for use in wireless communication at a base station, in accordance with various aspects of the present disclosure.

FIG. 11 shows a block diagram 1100 of a device 1005-*a* for use in wireless communication at a base station, in accordance with various aspects of the present disclosure. The device 1005-*a* may be an example of aspects of one or more of the base stations 105 described with reference to FIG. 1 or 2, or aspects of the device 1005 described with reference to FIG. 10. The device 1005-*a* may also be or include a processor. The device 1005-*a* may include a receiver module 1010-*a*, a wireless communication management module 1020-*a*, or a transmitter module 1030-*a*. Each of these modules may be in communication with each other. The receiver module 1010-*a* may include a LTE/LTE-A receiver module for dedicated RF spectrum band 1012-*a* or a LTE/LTE-A receiver module for shared RF spectrum band 1014-*a*. The transmitter module 1030-*a* may include a LTE/LTE-A transmitter module for dedicated RF spectrum band 1032-*a* or a LTE/LTE-A transmitter module for shared RF spectrum band 1034-*a*. In some cases, the receiver module 1010-*a*, wireless communication management module 1020-*a*, transmitter module 1030-*a*, LTE/LTE-A receiver module for dedicated RF spectrum band 1012-*a*, LTE/LTE-A receiver module for shared RF spectrum band 1014-*a*, LTE/LTE-A transmitter module for dedicated RF spectrum band 1032-*a*, or LTE/LTE-A transmitter module for shared RF spectrum band 1034-*a* may be a respective example of the receiver module 1010, wireless communication management module 1020, transmitter module 1030, LTE/LTE-A receiver module for dedicated RF spectrum band 1012, LTE/LTE-A receiver module for shared RF spectrum band 1014, LTE/LTE-A transmitter module for dedicated RF spectrum band 1032, or LTE/LTE-A transmitter module for shared RF spectrum band 1034 described with reference to FIG. 10.

The components of the device 1005-*a* may, individually or collectively, be implemented using one or more ASICs adapted to perform some or all of the applicable functions in hardware. Alternatively, the functions may be performed by one or more other processing units (or cores), on one or more integrated circuits. In other examples, others of integrated circuits may be used (e.g., Structured/Platform ASICs, FPGAs, a SoC, and/or others of Semi-Custom ICs), which may be programmed in any manner known in the art. The functions of each module may also be implemented, in whole or in part, with instructions embodied in a memory, formatted to be executed by one or more general or application-specific processors.

The wireless communication management module 1020-*a* may be used to manage one or more aspects of wireless communication for the device 1005-*a*. In some examples, the wireless communication management module 1020-*a* may include an access contention module 1035-*a* or a communication window multiplexing module 1040-*a*. In some examples, the communication window multiplexing module 1040-*a* may include an LBT frame configuration module 1135, a first CC LBT frame transmission module 1140, or a second CC LBT frame transmission module 1145.

The access contention module 1035-*a* may be used to contend for access to a shared channel of the shared radio frequency spectrum band. In some examples, the access contention module 1035-*a* may contend for access to the shared radio frequency spectrum band by performing an LBT procedure, such as a CCA procedure or an eCCA procedure. In some examples, the access contention module 1035-*a* may contend for access to the shared radio frequency spectrum band for each of a number of radio frames.

The communication window multiplexing module 1040-*a* may be used to time division multiplex first CC communication windows and second CC communication windows in the shared channel. In some examples, a duration of OFDM symbols of the first CC communication windows may be different from a duration of OFDM symbols of the second CC communication windows. The multiplexing may occur on the shared channel upon the access contention module 1035-*a* winning contention for access to the shared channel. In some examples, the first CC communication windows may include at least one eCC (e.g., one eCC), and the second CC communication windows may include at least one non-eCC (e.g., four non-eCCs).

In some examples of the device 1005-*a*, the time division multiplexing may be performed at a radio frame level or lower (e.g., within a radio frame). In some time division multiplexing examples, the communication window multiplexing module 1040 may signal partitioning between the first CC communication windows and the second CC communication windows in a control channel of a radio frame. Alternatively, partitioning between the first CC communication windows and the second CC communication windows may be indicated by transmitting, to one or more first CC capable UEs, one or more grants of resources for first CC communications (e.g., one or more grants including at least a first grant). In some examples, the partitioning may also be indicated by transmitting, to one or more second CC capable UEs, one or more grants of resources for second CC communications (e.g., one or more grants including at least a second grant).

The LBT frame configuration module 1135 may be used to configure an LBT frame as a first CC LBT frame, a second CC LBT frame, or a combination thereof. In some examples, an LBT frame may be configured based at least in part on a type of traffic to be scheduled in the LBT frame (e.g., first CC traffic, second CC traffic, or a combination thereof) or based at least in part on the types of UEs served by the device 1005-*a* (e.g., based at least in part on the numbers of first CC capable UEs and second CC capable UEs served by the device 1005-*a*).

The first CC LBT frame transmission module 1140 may be used, upon the LBT frame configuration module 1135 configuring an LBT frame as a first CC LBT frame, to transmit a first CC preamble and a first CC control/data portion in the first CC LBT frame. The first CC LBT frame transmission module 1140 may also transmit a Wi-Fi preamble in the first CC LBT frame (e.g., in the first CC preamble). Alternatively, the first CC LBT frame transmission module 1140 may be used, upon the LBT frame configuration module 1135 configuring an LBT frame as a first CC LBT frame, to transmit a second CC preamble, a first CC preamble, and a first CC control/data portion in the first CC LBT frame. The first CC LBT frame transmission module 1140 may also transmit a Wi-Fi preamble in the first CC LBT frame (e.g., in the second CC preamble). In some examples, the Wi-Fi preamble may precede the remainder of the second CC preamble. As another alternative, the first CC LBT frame transmission module 1140 may be used, upon the LBT frame configuration module 1135 configuring an LBT frame as a first CC LBT frame, to transmit a second CC preamble and a first CC control/data portion in the first CC LBT frame, without transmitting a first CC preamble. The first CC LBT frame transmission module 1140 may also transmit a Wi-Fi preamble in the first CC LBT frame (e.g., in the second CC preamble). In some examples, the Wi-Fi preamble may precede the remainder of the second CC preamble.

The second CC LBT frame transmission module 1145 may be used, upon the LBT frame configuration module 1135 configuring an LBT frame as a second CC LBT frame, to transmit a second CC preamble and a second CC control/data portion in the second CC LBT frame. The second CC LBT frame transmission module 1145 may also transmit a Wi-Fi preamble in the second CC LBT frame (e.g., in the second CC preamble). In some examples, the Wi-Fi preamble may precede the remainder of the second CC preamble.

When the first CC LBT frame transmission module 1140 or the second CC LBT frame transmission module 1145 transmits a second CC preamble, the module 1140 or 1145 may optionally transmit, in the second CC preamble, an indication of whether the LBT frame is configured as a first CC LBT frame or a second CC LBT frame. In some examples, the indication may include a scrambling, a PLMN ID, a cell ID, control signaling, a sequence, or a combination thereof.

Figure 12:
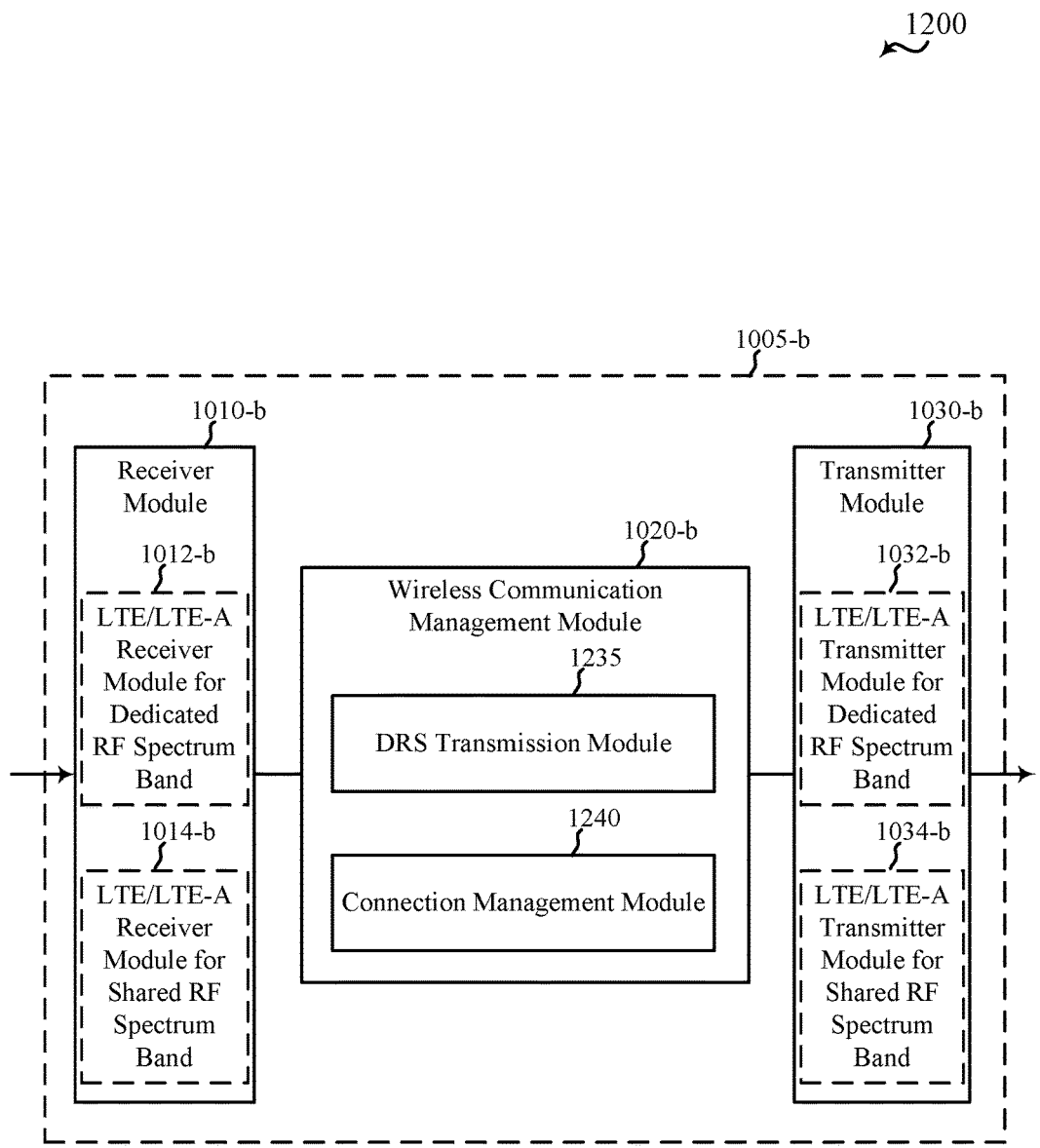
FIG. 12 shows a block diagram of a device for use in wireless communication at a base station, in accordance with various aspects of the present disclosure.

FIG. 12 shows a block diagram 1200 of a device 1005-*b* for use in wireless communication at a base station, in accordance with various aspects of the present disclosure. The device 1005-*b* may be an example of aspects of one or more of the base stations 105 described with reference to FIG. 1 or 2, or aspects of the device 1005 described with reference to FIG. 10 or 11. The device 1005-*b* may also be or include a processor. The device 1005-*b* may include a receiver module 1010-*b*, a wireless communication management module 1020-*b*, or a transmitter module 1030-*b*. Each of these modules may be in communication with each other. The receiver module 1010-*b* may include a LTE/LTE-A receiver module for dedicated RF spectrum band 1012-*b* or a LTE/LTE-A receiver module for shared RF spectrum band 1014-*b*. The transmitter module 1030-*b* may include a LTE/LTE-A transmitter module for dedicated RF spectrum band 1032-*b* or a LTE/LTE-A transmitter module for shared RF spectrum band 1034-*b*. In some cases, the receiver module 1010-*b*, wireless communication management module 1020-*b*, transmitter module 1030-*b*, LTE/LTE-A receiver module for dedicated RF spectrum band 1012-*b*, LTE/LTE-A receiver module for shared RF spectrum band 1014-*b*, LTE/LTE-A transmitter module for dedicated RF spectrum band 1032-*b*, or LTE/LTE-A transmitter module for shared RF spectrum band 1034-*b* may be a respective example of the receiver module 1010, wireless communication management module 1020, transmitter module 1030, LTE/LTE-A receiver module for dedicated RF spectrum band 1012, LTE/LTE-A receiver module for shared RF spectrum band 1014, LTE/LTE-A transmitter module for dedicated RF spectrum band 1032, or LTE/LTE-A transmitter module for shared RF spectrum band 1034 described with reference to FIG. 10.

The components of the device 1005-*b* may, individually or collectively, be implemented using one or more ASICs adapted to perform some or all of the applicable functions in hardware. Alternatively, the functions may be performed by one or more other processing units (or cores), on one or more integrated circuits. In other examples, others of integrated circuits may be used (e.g., Structured/Platform ASICs, FPGAs, a SoC, and/or others of Semi-Custom ICs), which may be programmed in any manner known in the art. The functions of each module may also be implemented, in whole or in part, with instructions embodied in a memory, formatted to be executed by one or more general or application-specific processors.

The wireless communication management module 1020-*b* may be used to manage one or more aspects of wireless communication for the device 1005-*b*. In some examples, the wireless communication management module 1020-*b* may include a DRS transmission module 1235 or a connection management module 1240.

The DRS transmission module 1235 may be used to broadcast a DRS in each of a plurality of discovery time periods. In some examples, the DRSs may be broadcast in a shared channel of the shared radio frequency spectrum band. In some examples, the DRSs may be transmitted in the shared channel after winning contention for access to part or all of the shared channel. The discovery reference signals may also or alternatively be transmitted in the shared channel without contending for access to the shared channel (e.g., in a plurality of CCA-exempt time periods).

In some examples of the device 1005-*b*, the DRS transmission module 1235 may broadcast a first CC DRS in each of the plurality of discovery time periods. In some examples, the DRS transmission module 1235 may broadcast a second CC DRS in each of the plurality of discovery time periods. In some examples, the DRS transmission module 1235 may broadcast a first CC DRS or a second CC DRS in each of the plurality of discovery time periods. In some examples, the DRS transmission module 1235 may broadcast a first CC DRS and a second CC DRS in each of the plurality of discovery time periods. In some examples, the DRS transmission module 1235 may broadcast a first CC DRS in each of a plurality of first CC discovery time periods, and broadcast a second CC DRS in each of a plurality of second CC discovery time periods. In some cases, the DRS transmission module 1235 may broadcast an indication of support for first CC communications (e.g., an indication of support for first CC communications by the device 1005-*b*) in a second CC DRS. In some examples, the first CC DRS may include an eCC DRS and the second CC DRS may include a non-eCC DRS.

The connection management module 1240 may be used to receive a first CC connection request from a UE (e.g., via a random access channel (RACH) procedure). Upon receiving the first CC connection request from the UE, the connection management module 1240 may be used to establish a first CC connection with the UE. Also or alternatively, the connection management module 1240 may be used to receive a second CC connection request from a UE (e.g., via a RACH procedure initiated by the same UE or a different UE). Upon receiving the second CC connection request from the UE, the connection management module 1240 may be used to establish a second CC connection with the UE. In some examples, a UE that acquires a base station including the device 1005-*b* via a second CC connection request may report to the base station that the UE is first CC capable (i.e., the connection management module 1240 may receive first CC capability information from the UE). In these examples, the connection management module 1240 may configure a first CC connection with the UE.

In some examples, aspects of the devices 1005 described with reference to FIG. 10, 11, or 12 may be combined.

Figure 13:
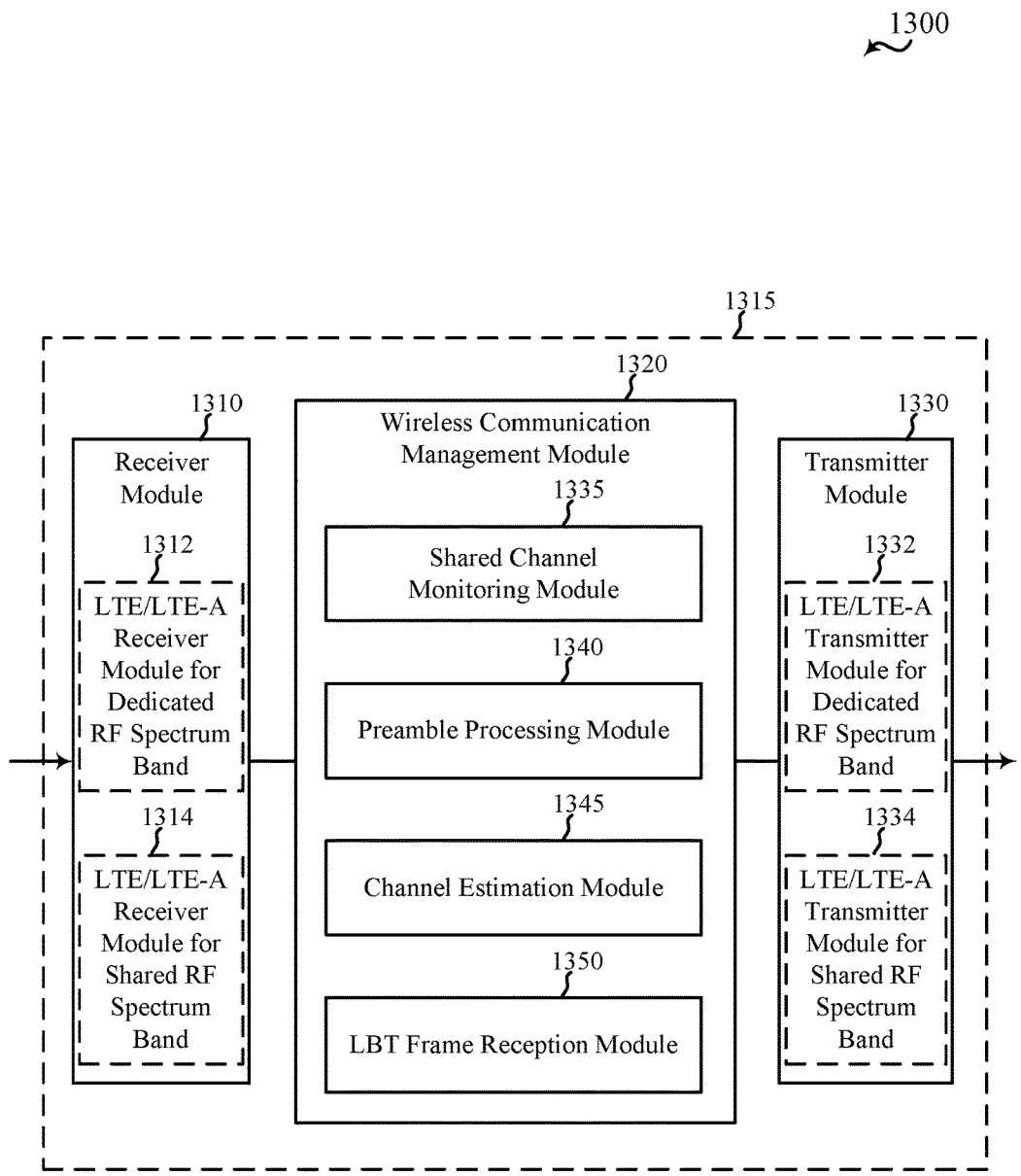
FIG. 13 shows a block diagram of a device for use in wireless communication at a base station, in accordance with various aspects of the present disclosure.

FIG. 13 shows a block diagram 1300 of a device 1315 for use in wireless communication at a UE, in accordance with various aspects of the present disclosure. The device 1315 may be an example of aspects of one or more of the UEs 115 described with reference to FIG. 1 or 2. The device 1315 may also be or include a processor. The device 1315 may include a receiver module 1310, a wireless communication management module 1320, or a transmitter module 1330. Each of these modules may be in communication with each other.

The modules of the device 1315 may, individually or collectively, be implemented using one or more ASICs adapted to perform some or all of the applicable functions in hardware. Alternatively, the functions may be performed by one or more other processing units (or cores), on one or more integrated circuits. In other examples, others of integrated circuits may be used (e.g., Structured/Platform ASICs, FPGAs, a SoC, and/or others of Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1310 may include at least one RF receiver, such as at least one RF receiver operable to receive transmissions over a dedicated radio frequency spectrum band (e.g., a radio frequency spectrum band for which transmitting devices may not contend for access because the radio frequency spectrum band is licensed to particular users for particular uses (e.g., a licensed radio frequency spectrum band usable for LTE/LTE-A communications)) or a shared radio frequency spectrum band (e.g., a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1 or 2. The receiver module 1310 may in some cases include separate receivers for the dedicated radio frequency spectrum band and the shared radio frequency spectrum band. The separate receivers may, in some examples, take the form of an LTE/LTE-A receiver module for communicating over the dedicated radio frequency spectrum band (e.g., LTE/LTE-A receiver module for dedicated RF spectrum band 1312), and an LTE/LTE-A receiver module for communicating over the shared radio frequency spectrum band (e.g., LTE/LTE-A receiver module for shared RF spectrum band 1314). The receiver module 1310, including the LTE/LTE-A receiver module for dedicated RF spectrum band 1312 or the LTE/LTE-A receiver module for shared RF spectrum band 1314, may be used to receive various data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter module 1330 may include at least one RF transmitter, such as at least one RF transmitter operable to transmit over the dedicated radio frequency spectrum band or the shared radio frequency spectrum band. The transmitter module 1330 may in some cases include separate transmitters for the dedicated radio frequency spectrum band and the shared radio frequency spectrum band. The separate transmitters may, in some examples, take the form of an LTE/LTE-A transmitter module for communicating over the dedicated radio frequency spectrum band (e.g., LTE/LTE-A transmitter module for dedicated RF spectrum band 1332), and an LTE/LTE-A transmitter module for communicating over the shared radio frequency spectrum band (e.g., LTE/LTE-A transmitter module for shared RF spectrum band 1334). The transmitter module 1330, including the LTE/LTE-A transmitter module for dedicated RF spectrum band 1332 or the LTE/LTE-A transmitter module for shared RF spectrum band 1334, may be used to transmit various data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication management module 1320 may be used to manage one or more aspects of wireless communication for the device 1315. In some examples, the wireless communication management module 1320 may include a shared channel monitoring module 1335, a preamble processing module 1340, a channel estimation module 1345, or an LBT frame reception module 1350.

The shared channel monitoring module 1335 may be used to monitor a shared channel of the shared radio frequency spectrum band for a first CC LBT frame.

The preamble processing module 1340 may be used to receive, in a second CC preamble, an indication of the first CC LBT frame. In some examples, the indication may be received in a control channel of the second CC preamble. In some examples, the indication may include a scrambling, a PLMN ID, a cell ID, control signaling, a sequence, or a combination thereof. In some examples, the preamble processing module 1340 may receive, in the second CC preamble, a Wi-Fi preamble. In some examples, the first CC LBT frame may include at least one eCC.

The channel estimation module 1345 may be used to obtain, from the second CC preamble, a channel estimation for the shared channel.

The LBT frame reception module 1350 may be used to receive a first CC transmission in the first CC LBT frame. The first CC transmission may include a first CC preamble and a first CC control/data portion. Alternatively, the LBT frame reception module 1350 may be used to receive a first CC transmission in the first CC LBT frame, where the first CC transmission includes a first CC control/data portion transmitted without a first CC preamble.

Figure 14:
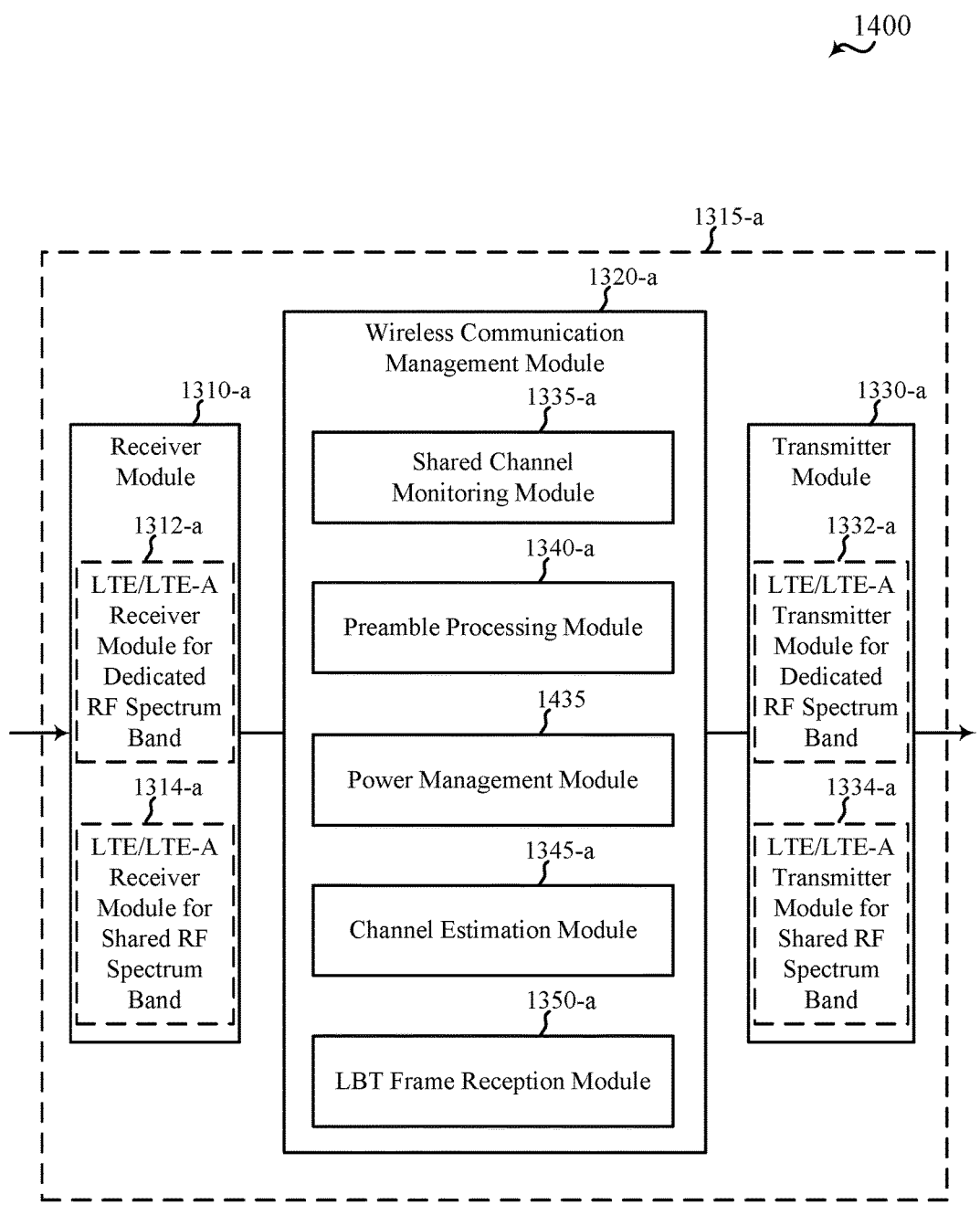
FIG. 14 shows a block diagram of a device for use in wireless communication at a base station, in accordance with various aspects of the present disclosure.

FIG. 14 shows a block diagram 1400 of a device 1315-*a* for use in wireless communication at a UE, in accordance with various aspects of the present disclosure. The device 1315-*a* may be an example of aspects of one or more of the UEs 115 described with reference to FIG. 1 or 2, or aspects of the device 1315 described with reference to FIG. 13. The device 1315-*a* may also be or include a processor. The device 1315-*a* may include a receiver module 1310-*a*, a wireless communication management module 1320-*a*, or a transmitter module 1330-*a*. Each of these modules may be in communication with each other. The receiver module 1310-*a* may include a LTE/LTE-A receiver module for dedicated RF spectrum band 1312-*a* or a LTE/LTE-A receiver module for shared RF spectrum band 1314-*a*. The transmitter module 1330-*a* may include a LTE/LTE-A transmitter module for dedicated RF spectrum band 1332-*a* or a LTE/LTE-A transmitter module for shared RF spectrum band 1334-*a*. In some cases, the receiver module 1310-*a*, wireless communication management module 1320-*a*, transmitter module 1330-*a*, LTE/LTE-A receiver module for dedicated RF spectrum band 1312-*a*, LTE/LTE-A receiver module for shared RF spectrum band 1314-*a*, LTE/LTE-A transmitter module for dedicated RF spectrum band 1332-*a*, or LTE/LTE-A transmitter module for shared RF spectrum band 1334-*a* may be a respective example of the receiver module 1310, wireless communication management module 1320, transmitter module 1330, LTE/LTE-A receiver module for dedicated RF spectrum band 1312, LTE/LTE-A receiver module for shared RF spectrum band 1314, LTE/LTE-A transmitter module for dedicated RF spectrum band 1332, or LTE/LTE-A transmitter module for shared RF spectrum band 1334 described with reference to FIG. 13.

The components of the device 1315-*a* may, individually or collectively, be implemented using one or more ASICs adapted to perform some or all of the applicable functions in hardware. Alternatively, the functions may be performed by one or more other processing units (or cores), on one or more integrated circuits. In other examples, others of integrated circuits may be used (e.g., Structured/Platform ASICs, FPGAs, a SoC, and/or others of Semi-Custom ICs), which may be programmed in any manner known in the art. The functions of each module may also be implemented, in whole or in part, with instructions embodied in a memory, formatted to be executed by one or more general or application-specific processors.

The wireless communication management module 1320-*a* may be used to manage one or more aspects of wireless communication for the device 1315-*a*. In some examples, the wireless communication management module 1320-*a* may include a shared channel monitoring module 1335-*a*, a preamble processing module 1340-*a*, a power management module 1435, a channel estimation module 1345-*a*, or an LBT frame reception module 1350-*a*.

The shared channel monitoring module 1335-*a* may be used to monitor a shared channel of the shared radio frequency spectrum band for a second CC LBT frame.

The preamble processing module 1340-*a* may be used to receive a second CC preamble. In some examples, the preamble processing module 1340-*a* may receive a Wi-Fi preamble in the second CC preamble. The preamble processing module 1340-*a* may determine whether the second CC preamble indicates a first CC LBT frame is being transmitted or a second CC LBT frame is being transmitted. In some examples, the first CC LBT frame may include at least one eCC and the second CC LBT frame may include at least one non-eCC. In some examples, the indication of whether a first CC LBT frame or a second CC LBT frame is being transmitted may be received in a control channel of the second CC preamble. In some examples, the indication may include a scrambling, a PLMN ID, a cell ID, control signaling, a sequence, or a combination thereof.

The preamble processing module 1340-*a* may also be used to determine, from a second CC preamble, whether the second CC preamble is transmitted in an LBT frame having a grant for the device 1315-*a*. The preamble processing module 1340-*a* may also be used to determine, from the second CC preamble, whether an LBT frame not intended for the device 1315-*a* is being transmitted.

The power management module 1435 may be used to enter a sleep state, for a remainder of an LBT frame, when the preamble processing module 1340-*a* determines the LBT frame is an LBT frame not intended for the device 1315-*a* or when the preamble processing module 1340-*a* determines the LBT frame has no grant for the device 1315-*a*. For example, the device 1315-*a* may be a second CC capable device or may be interested in listening to just second CC LBT frames. In such an example, the power management module 1435 may be used to enter a sleep state for the remainder of an LBT frame when the preamble processing module 1340-*a* determines the LBT frame is a first CC LBT frame.

The channel estimation module 1345-*a* may be used to obtain, from the second CC preamble, a channel estimation for the shared channel.

The LBT frame reception module 1350-*a* may be used to receive a second CC transmission in a second CC LBT frame. The second CC transmission may include the second CC preamble and a second CC control/data portion.

Figure 15:
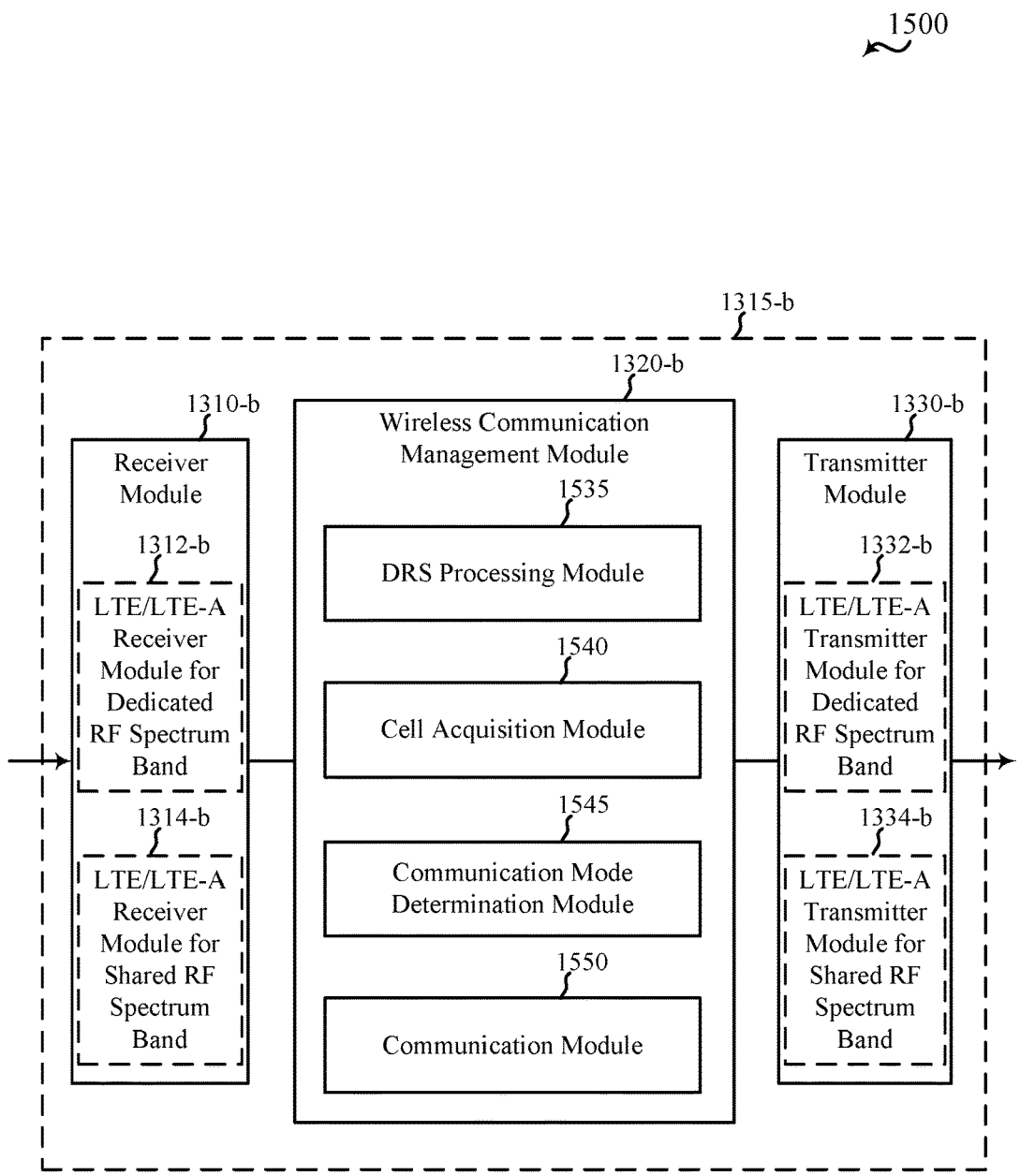
FIG. 15 shows a block diagram of a device for use in wireless communication at a base station, in accordance with various aspects of the present disclosure.

FIG. 15 shows a block diagram 1500 of a device 1315-*b* for use in wireless communication at a UE, in accordance with various aspects of the present disclosure. The device 1315-*b* may be an example of aspects of one or more of the UEs 115 described with reference to FIG. 1 or 2, or aspects of the device 1315 described with reference to FIG. 13 or 14. The device 1315-*b* may also be or include a processor. The device 1315-*b* may include a receiver module 1310-*b*, a wireless communication management module 1320-*b*, or a transmitter module 1330-*b*. Each of these modules may be in communication with each other. The receiver module 1310-*b* may include a LTE/LTE-A receiver module for dedicated RF spectrum band 1312-*b* or a LTE/LTE-A receiver module for shared RF spectrum band 1314-*b*. The transmitter module 1330-*b* may include a LTE/LTE-A transmitter module for dedicated RF spectrum band 1332-*b* or a LTE/LTE-A transmitter module for shared RF spectrum band 1334-*b*. In some cases, the receiver module 1310-*b*, wireless communication management module 1320-*b*, transmitter module 1330-*b*, LTE/LTE-A receiver module for dedicated RF spectrum band 1312-*b*, LTE/LTE-A receiver module for shared RF spectrum band 1314-*b*, LTE/LTE-A transmitter module for dedicated RF spectrum band 1332-*b*, or LTE/LTE-A transmitter module for shared RF spectrum band 1334-*b* may be a respective example of the receiver module 1310, wireless communication management module 1320, transmitter module 1330, LTE/LTE-A receiver module for dedicated RF spectrum band 1312, LTE/LTE-A receiver module for shared RF spectrum band 1314, LTE/LTE-A transmitter module for dedicated RF spectrum band 1332, or LTE/LTE-A transmitter module for shared RF spectrum band 1334 described with reference to FIG. 13.

The components of the device 1315-*b* may, individually or collectively, be implemented using one or more ASICs adapted to perform some or all of the applicable functions in hardware. Alternatively, the functions may be performed by one or more other processing units (or cores), on one or more integrated circuits. In other examples, others of integrated circuits may be used (e.g., Structured/Platform ASICs, FPGAs, a SoC, and/or others of Semi-Custom ICs), which may be programmed in any manner known in the art. The functions of each module may also be implemented, in whole or in part, with instructions embodied in a memory, formatted to be executed by one or more general or application-specific processors.

The wireless communication management module 1320-*b* may be used to manage one or more aspects of wireless communication for the device 1315-*b*. In some examples, the wireless communication management module 1320-*b* may include a DRS processing module 1535, a cell acquisition module 1540, a communication mode determination module 1545, or a communication module 1550.

The DRS processing module 1535 may be used to receive a DRS from a base station. In some examples, the DRS may be received in a shared channel of the shared radio frequency spectrum band.

The cell acquisition module 1540 may be used to acquire a first CC cell of a base station when the DRS processing module 1535 receives a first CC DRS, or to acquire a second CC cell of a base station when the DRS processing module 1535 receives a second CC DRS. In some examples, the first CC DRS may include at least one eCC DRS and the second CC DRS may include at least one non-eCC DRS. Similarly, the first CC cell may include an eCC cell and the second CC cell may include a non-eCC cell.

The communication mode determination module 1545 may be used to determine whether a base station supports first CC communications. In some examples, the communication mode determination module 1545 may determine that a base station supports first CC communications based at least in part on an indication received in a second CC DRS. In some examples, the communication mode determination module 1545 may determine that a base station supports first CC communications based at least in part on second CC configuration information received from the base station (e.g., after acquiring the second CC cell of the base station). In some examples, the communication mode determination module 1545 may determine that a base station supports first CC communications based at least in part on a first CC DRS received from the base station.

The communication module 1550 may be used to communicate with a base station using first CC communications or second CC communications, depending on the base station's capabilities. In some examples, the DRS processing module 1535 may use OFDM numerology of a second CC while receiving a second CC DRS, and the communication module 1550 may use OFDM numerology of a first CC while communicating with the base station using first CC communications.

Figure 16:
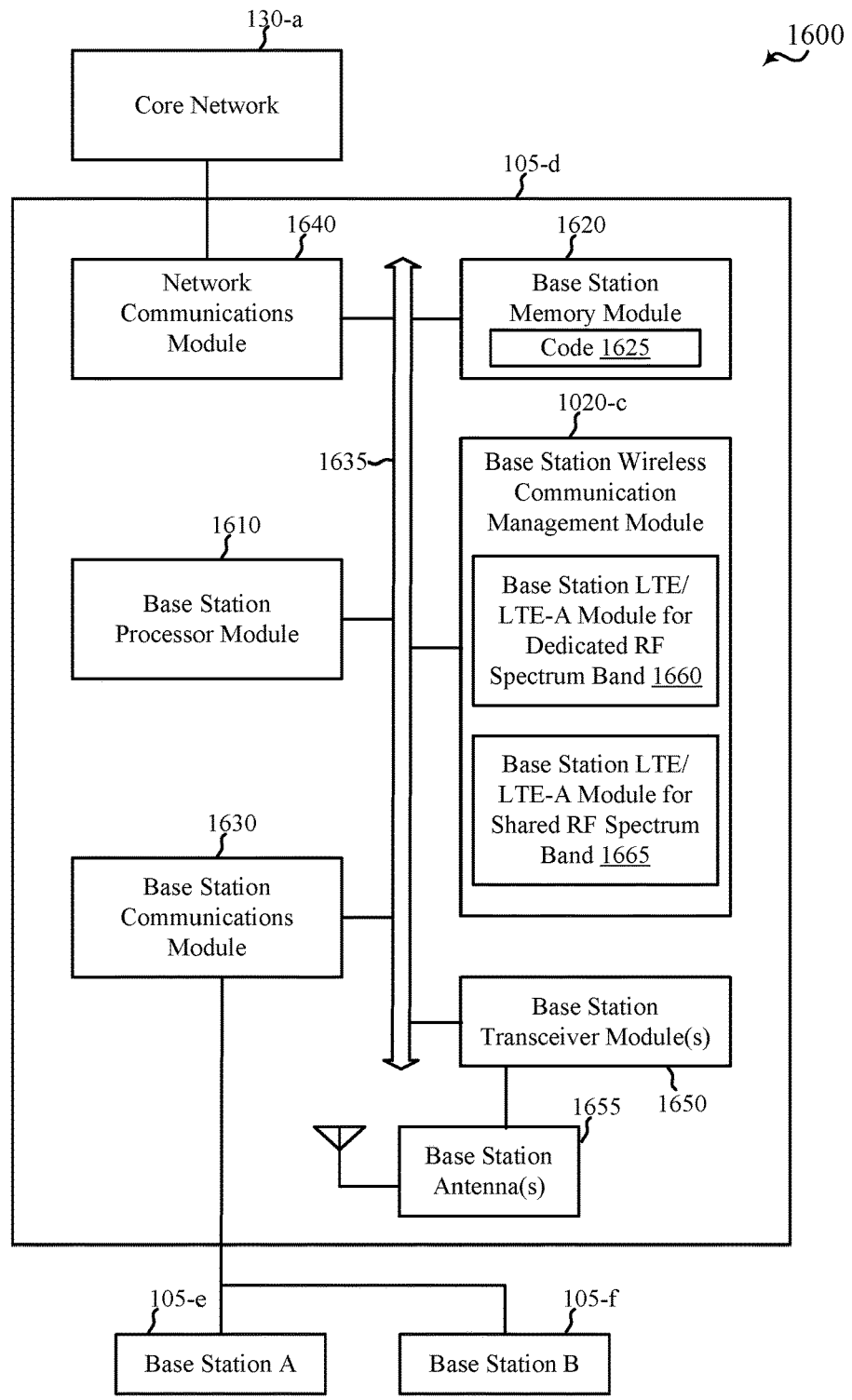
FIG. 16 shows a block diagram of a base station (e.g., a base station forming part or all of an evolved Node B (eNB)) for use in wireless communication, in accordance with various aspects of the present disclosure.

FIG. 16 shows a block diagram 1600 of a base station 105-*d* (e.g., a base station forming part or all of an eNB) for use in wireless communication, in accordance with various aspects of the present disclosure. In some examples, the base station 105-*d* may be an example of aspects of one or more of the base stations 105 or devices 1005 described with reference to FIG. 1, 2, 10, 11, or 12. The base station 105-d may be configured to implement or facilitate at least some of the base station features and functions described with reference to FIGS. 1-12.

The base station 105-d may include a base station processor module 1610, a base station memory module 1620, at least one base station transceiver module (represented by base station transceiver module(s) 1650), at least one base station antenna (represented by base station antenna(s) 1655), or a base station wireless communication management module 1020-c. The base station 105-d may also include one or more of a base station communications module 1630 or a network communications module 1640. Each of these components may be in communication with each other, directly or indirectly, over one or more buses 1635.

The base station memory module 1620 may include random access memory (RAM) or read-only memory (ROM). The base station memory module 1620 may store computer-readable, computer-executable code 1625 containing instructions that are configured to, when executed, cause the base station processor module 1610 to perform various functions described herein related to wireless communication, including, for example, the communication window multiplexing, DRS transmission, or UE connection management functions described with reference to FIGS. 1-12. Alternatively, the code 1625 may not be directly executable by the base station processor module 1610 but be configured to cause the base station 105-d (e.g., when compiled and executed) to perform various of the functions described herein.

The base station processor module 1610 may include an intelligent hardware device, e.g., a central processing unit (CPU), a microcontroller, an ASIC, etc. The base station processor module 1610 may process information received through the base station transceiver module(s) 1650, the base station communications module 1630, or the network communications module 1640. The base station processor module 1610 may also process information to be sent to the transceiver module(s) 1650 for transmission through the antenna(s) 1655, to the base station communications module 1630, for transmission to one or more other base stations 105-e and 105-f, or to the network communications module 1640 for transmission to a core network 130-a, which may be an example of one or more aspects of the core network 130 described with reference to FIG. 1. The base station processor module 1610 may handle, alone or in connection with the base station wireless communication management module 1020-c, various aspects of communicating over (or managing communications over) a dedicated radio frequency spectrum band or a shared radio frequency spectrum band. The dedicated radio frequency spectrum band may include a radio frequency spectrum band for which transmitting devices may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting devices may contend for access (e.g., a radio frequency spectrum band that is available for unlicensed use, such as Wi-Fi use, or a radio frequency spectrum band that is available for use by multiple operators in an equally shared or prioritized manner).

The base station transceiver module(s) 1650 may include a modem configured to modulate packets and provide the modulated packets to the base station antenna(s) 1655 for transmission, and to demodulate packets received from the base station antenna(s) 1655. The base station transceiver module(s) 1650 may, in some examples, be implemented as one or more base station transmitter modules and one or more separate base station receiver modules. The base station transceiver module(s) 1650 may support communications in the dedicated radio frequency spectrum band or the shared radio frequency spectrum band. The base station transceiver module(s) 1650 may be configured to communicate bi-directionally, via the antenna(s) 1655, with one or more UEs or other devices, such as one or more of the UEs 115 or devices 1315 described with reference to FIG. 1, 2, 13, 14, or 15. The base station 105-d may, for example, include multiple base station antennas 1655 (e.g., an antenna array). The base station 105-d may communicate with the core network 130-a through the network communications module 1640. The base station 105-d may also communicate with other base stations, such as the base stations 105-e and 105-f, using the base station communications module 1630.

The base station wireless communication management module 1020-c may be configured to perform or control some or all of the features or functions described with reference to FIGS. 1-12 related to wireless communication over the dedicated radio frequency spectrum band or the shared radio frequency spectrum band. The base station wireless communication management module 1020-c may include a base station LTE/LTE-A module for dedicated RF spectrum band 1660 configured to handle LTE/LTE-A communications in the dedicated radio frequency spectrum band or a base station LTE/LTE-A module for shared RF spectrum band 1665 configured to handle LTE/LTE-A communications in the shared radio frequency spectrum band. The base station wireless communication management module 1020-c, or portions of it, may include a processor, or some or all of the functions of the base station wireless communication management module 1020-c may be performed by the base station processor module 1610 or in connection with the base station processor module 1610. In some examples, the base station wireless communication management module 1020-c may be an example of the wireless communication management module 1020 described with reference to FIG. 10, 11, or 12.

Figure 17:
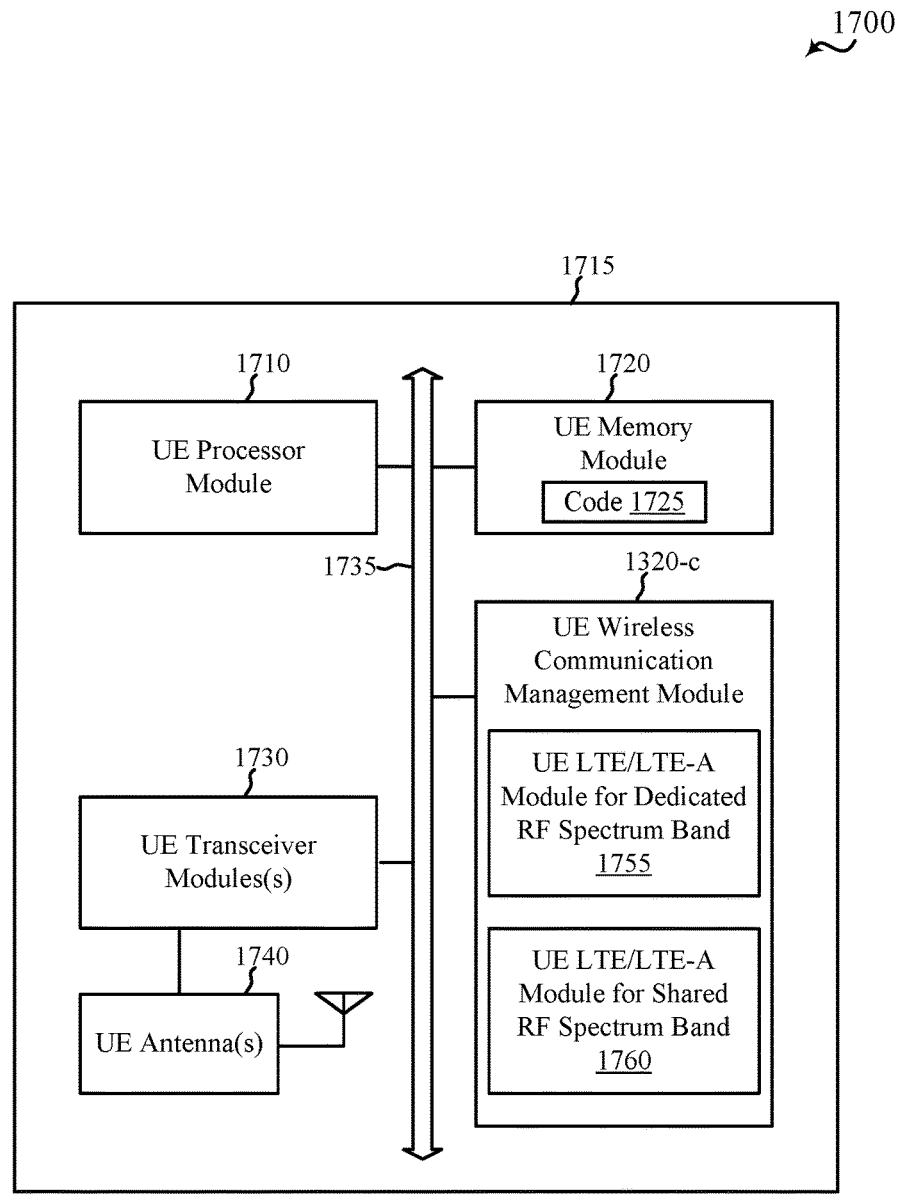
FIG. 17 shows a block diagram of a user equipment (UE) for use in wireless communication, in accordance with various aspects of the present disclosure.

FIG. 17 shows a block diagram 1700 of a UE 115-d for use in wireless communication, in accordance with various aspects of the present disclosure. The UE 115-d may have various configurations and may be a wireless communication device, a personal computer (e.g., a laptop computer, a netbook computer, a tablet computer, etc.), a handheld device, a cellular telephone, a smart phone, a cordless phone, a wireless modem, a wireless local loop (WLL) station, a personal digital assistant (PDA), a digital video recorder (DVR), an internet appliance, a gaming console, an e-reader, etc. The UE 115-d may, in some examples, have an internal power supply (not shown), such as a small battery, to facilitate mobile operation. In some examples, the UE 115-d may be an example of aspects of one or more of the UEs 115 or devices 1315 described with reference to FIG. 1, 2, 13, 14, or 15. The UE 115-d may be configured to implement at least some of the UE or device features and functions described with reference to FIGS. 1-9 and 13-15.

The UE 115-d may include a UE processor module 1710, a UE memory module 1720, at least one UE transceiver module (represented by UE transceiver module(s) 1730), at least one UE antenna (represented by UE antenna(s) 1740), or a UE wireless communication management module 1320-

*c*. Each of these components may be in communication with each other, directly or indirectly, over one or more buses 1735.

The UE memory module 1720 may include RAM or ROM. The UE memory module 1720 may store computer-readable, computer-executable code 1725 containing instructions that are configured to, when executed, cause the UE processor module 1710 to perform various functions described herein related to wireless communication, including, for example, communicating in multiplexed communication windows or acquiring a cell of a base station, as described with reference to FIGS. 1-9 and 13-15. Alternatively, the code 1725 may not be directly executable by the UE processor module 1710 but be configured to cause the UE 115-*d* (e.g., when compiled and executed) to perform various of the functions described herein.

The UE processor module 1710 may include an intelligent hardware device, e.g., a CPU, a microcontroller, an ASIC, etc. The UE processor module 1710 may process information received through the UE transceiver module(s) 1730 or information to be sent to the UE transceiver module(s) 1730 for transmission through the UE antenna(s) 1740. The UE processor module 1710 may handle, alone or in connection with the UE wireless communication management module 1320-*c*, various aspects of communicating over (or managing communications over) a dedicated radio frequency spectrum band (e.g., a radio frequency spectrum band for which transmitting devices may not contend for access because the radio frequency spectrum band is licensed to particular users for particular uses (e.g., a licensed radio frequency spectrum band usable for LTE/LTE-A communications)) or a shared radio frequency spectrum band (e.g., a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner)).

The UE transceiver module(s) 1730 may include a modem configured to modulate packets and provide the modulated packets to the UE antenna(s) 1740 for transmission, and to demodulate packets received from the UE antenna(s) 1740. The UE transceiver module(s) 1730 may, in some examples, be implemented as one or more UE transmitter modules and one or more separate UE receiver modules. The UE transceiver module(s) 1730 may support communications over one or more wireless channels. The UE transceiver module(s) 1730 may be configured to communicate bi-directionally, via the UE antenna(s) 1740, with one or more base stations or other devices, such as one or more of the base stations 105 or devices 1005 described with reference to FIG. 1, 2, 10, 11, 12, or 16. While the UE 115-*d* may include a single UE antenna, there may be examples in which the UE 115-*d* may include multiple UE antennas 1740.

The UE wireless communication management module 1320-*c* may be configured to perform or control some or all of the UE or device features or functions described with reference to FIGS. 1-9 and 13-15 related to wireless communication over the dedicated radio frequency spectrum band or the shared radio frequency spectrum band. The UE wireless communication management module 1320-*c* may include a UE LTE/LTE-A module for dedicated RF spectrum band 1760 configured to handle LTE/LTE-A communications in the dedicated radio frequency spectrum band, or a UE LTE/LTE-A module for shared RF spectrum band 1765 configured to handle LTE/LTE-A communications in the shared radio frequency spectrum band. The UE wireless communication management module 1320-*c*, or portions of it, may include a processor, or some or all of the functions of the UE wireless communication management module 1320-*c* may be performed by the UE processor module 1710 or in connection with the UE processor module 1710. In some examples, the UE wireless communication management module 1320-*c* may be an example of the wireless communication management module 1320 described with reference to FIG. 13, 14, or 15.

Figure 18:
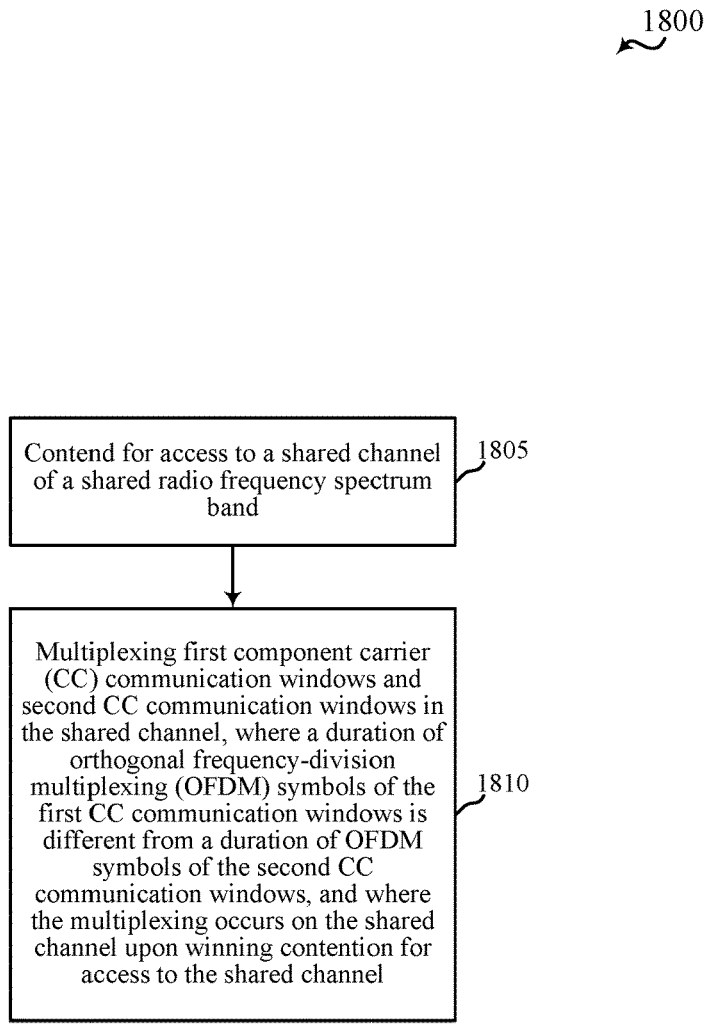
FIG. 18 is a flow chart illustrating an example of a method for wireless communication at a base station or device, in accordance with various aspects of the present disclosure.

FIG. 18 is a flow chart illustrating an example of a method 1800 for wireless communication at a base station or device, such as a base station or device including aspects of one or more of the base stations 105 or devices 1005 described with reference to FIG. 1, 2, 10, 11, 12, or 16, in accordance with various aspects of the present disclosure. In some examples, a base station or device may execute one or more sets of codes to control the functional elements of the base station or device to perform the functions described below.

At block 1805, a base station may contend for access to a shared channel of a shared radio frequency spectrum band. In some examples, the contending for access may include performing an LBT procedure, such as a CCA procedure or an eCCA procedure. The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner). The operation(s) at block 1805 may be performed using the wireless communication management module 1020 described with reference to FIG. 10, 11, 12, or 16, or the access contention module 1035 described with reference to FIG. 10 or 11.

At block 1810, the base station may multiplex first CC communication windows and second CC communication windows in the shared channel. In some examples, a duration of OFDM symbols of the first CC communication windows may be different from a duration of OFDM symbols of the second CC communication windows. The multiplexing may occur on the shared channel upon winning contention for access to the shared channel at block 1805. In some examples, the first CC communication windows may include at least one eCC (e.g., one eCC), and the second CC communication windows may include at least one non-eCC (e.g., four non-eCCs). The operation(s) at block 1810 may be performed using the wireless communication management module 1020 described with reference to FIG. 10, 11, 12, or 16, or the communication window multiplexing module 1040 described with reference to FIG. 10 or 11.

In some examples of the method 1800, the multiplexing performed at block 1810 may include frequency domain multiplexing the first CC communication windows and the second CC communication windows in the shared channel. In some examples, the multiplexing may include time division multiplexing the first CC communication windows and the second CC communication windows in the shared channel. The time division multiplexing may be performed, for example, at a radio frame level or lower (e.g., within a radio frame). In some time division multiplexing examples, partitioning between the first CC communication windows and the second CC communication windows may be signaled in a control channel of a radio frame. Alternatively, partitioning between the first CC communication windows and the second CC communication windows may be indicated by transmitting, to one or more first CC capable UEs, one or more grants of resources for first CC communications (e.g., one or more grants including at least a first grant). In some examples, the partitioning may also be indicated by transmitting, to one or more second CC capable UEs, one or more grants of resources for second CC communications (e.g., one or more grants including at least a second grant).

Thus, the method 1800 may provide for wireless communication. It should be noted that the method 1800 is just one implementation and that the operations of the method 1800 may be rearranged or otherwise modified such that other implementations are possible.

Figure 19:
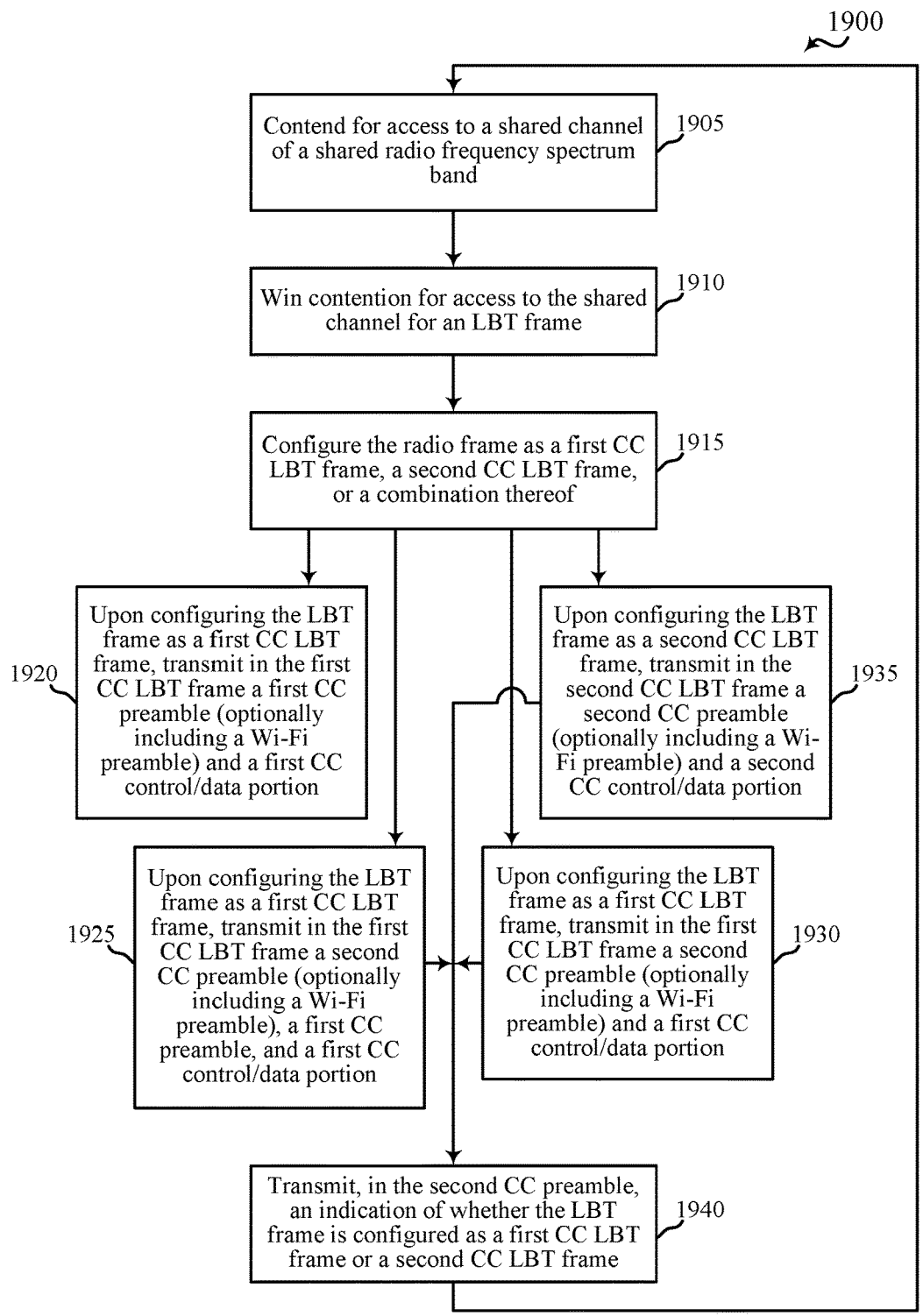
FIG. 19 is a flow chart illustrating an example of a method for wireless communication at a base station or device, in accordance with various aspects of the present disclosure.

FIG. 19 is a flow chart illustrating an example of a method 1900 for wireless communication at a base station or device, such as a base station or device including aspects of one or more of the base stations 105 or devices 1005 described with reference to FIG. 1, 2, 10, 11, 12, or 16, in accordance with various aspects of the present disclosure. In some examples, a base station or device may execute one or more sets of codes to control the functional elements of the base station or device to perform the functions described below.

At block 1905, a base station may contend for access to a shared channel of a shared radio frequency spectrum band. In some examples, the contending for access may include performing an LBT procedure, such as a CCA procedure or an eCCA procedure. The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner). In some examples, the base station may contend for access to the shared radio frequency spectrum band for each of a number of radio frames. The operation(s) at block 1905 may be performed using the wireless communication management module 1020 described with reference to FIG. 10, 11, 12, or 16, or the access contention module 1035 described with reference to FIG. 10 or 11.

At one or more of blocks 1910, 1915, 1920, 1925, 1930, 1935, or 1940, the base station may time division multiplex first CC communication windows and second CC communication windows in the shared channel. In some examples, a duration of OFDM symbols of the first CC communication windows may be different from a duration of OFDM symbols of the second CC communication windows. The multiplexing may occur on the shared channel upon winning contention for access to the shared channel at block 1905. In some examples, the first CC communication windows may include at least one eCC (e.g., one eCC), and the second CC communication windows may include at least one non-eCC (e.g., four non-eCCs).

In some examples of the method 1900, the time division multiplexing may be performed at a radio frame level or lower (e.g., within a radio frame). In some time division multiplexing examples, partitioning between the first CC communication windows and the second CC communication windows may be signaled in a control channel of a radio frame. Alternatively, partitioning between the first CC communication windows and the second CC communication windows may be indicated by transmitting, to one or more first CC capable UEs, one or more grants of resources for first CC communications (e.g., one or more grants including at least a first grant). In some examples, the partitioning may also be indicated by transmitting, to one or more second CC capable UEs, one or more grants of resources for second CC communications (e.g., one or more grants including at least a second grant).

At block 1910, the base station may win contention for access to the shared channel for an LBT frame. The operation(s) at block 1910 may be performed using the wireless communication management module 1020 described with reference to FIG. 10, 11, 12, or 16, or the access contention module 1035 described with reference to FIG. 10 or 11.

At block 1915, the base station may configure the LBT frame as a first CC LBT frame, a second CC LBT frame, or a combination thereof. In some examples, the LBT frame may be configured based at least in part on a type of traffic to be scheduled in the LBT frame (e.g., first CC traffic, second CC traffic, or a combination thereof) or based at least in part on the types of UEs served by the base station (e.g., based at least in part on the numbers of first CC capable UEs and second CC capable UEs served by the base station). Upon configuring the LBT frame, the method 1900 may continue at block 1920 or 1925. The operation(s) at block 1915 may be performed using the wireless communication management module 1020 described with reference to FIG. 10, 11, 12, or 16, or the LBT frame configuration module 1135 described with reference to FIG. 11.

At block 1920, and upon configuring the LBT frame as a first CC LBT frame, the base station may transmit, in the first CC LBT frame, a first CC preamble and a first CC control/data portion. The base station may also transmit a Wi-Fi preamble in the first CC LBT frame (e.g., in the first CC preamble). In some examples, the Wi-Fi preamble may precede the remainder of the first CC preamble.

At block 1925, and as an alternative to the operation(s) at block 1920, the base station may transmit, in the first CC LBT frame, a second CC preamble, a first CC preamble, and a first CC control/data portion. The base station may also transmit a Wi-Fi preamble in the first CC LBT frame (e.g., in the second CC preamble). In some examples, the Wi-Fi preamble may precede the remainder of the second CC preamble.

At block 1930, and as an alternative to the operation(s) at block 1920 or 1925, the base station may transmit, in the first CC LBT frame, a second CC preamble and a first CC control/data portion, without transmitting a first CC preamble. The base station may also transmit a Wi-Fi preamble in the first CC LBT frame (e.g., in the second CC preamble). In some examples, the Wi-Fi preamble may precede the remainder of the second CC preamble.

At block 1935, and upon configuring the LBT frame as a second CC LBT frame, the base station may transmit, in the second CC LBT frame, a second CC preamble and a second CC control/data portion. The base station may also transmit a Wi-Fi preamble in the second CC LBT frame (e.g., in the second CC preamble). In some examples, the Wi-Fi preamble may precede the remainder of the second CC preamble.

At block 1940, and when transmitting a second CC preamble at block 1925, 1930, or 1935, the base station may optionally transmit, in the second CC preamble, an indication of whether the LBT frame is configured as a first CC LBT frame or a second CC LBT frame. In some examples, the indication may include a scrambling, a PLMN ID, a cell ID, control signaling, a sequence, or a combination thereof.

The operation(s) at block 1920, 1925, 1930, 1935, or 1940 may be performed using the wireless communication management module 1020 described with reference to FIG. 10, 11, 12, or 16, the communication window multiplexing module 1040 described with reference to FIG. 10 or 11, or the first CC LBT frame transmission module 1140 or second CC LBT frame transmission module 1145 described with reference to FIG. 11.

Following the operations at one or more of blocks 1920, 1925, 1930, 1935, or 1940, the base station may once again contend for access to the shared radio frequency spectrum band at block 1905.

Thus, the method 1900 may provide for wireless communication. It should be noted that the method 1900 is just one implementation and that the operations of the method 1900 may be rearranged or otherwise modified such that other implementations are possible.

Figure 20:
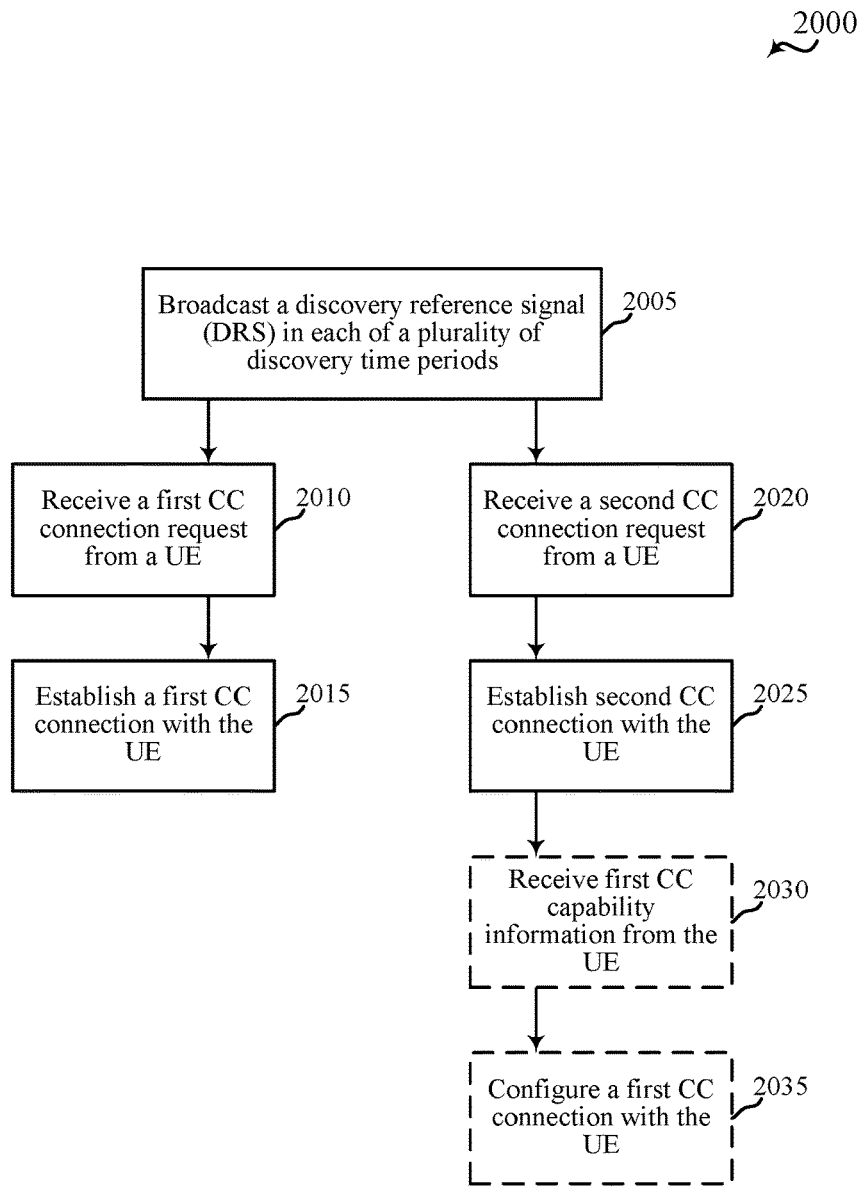
FIG. 20 is a flow chart illustrating an example of a method for wireless communication at a base station or device, in accordance with various aspects of the present disclosure.

FIG. 20 is a flow chart illustrating an example of a method 2000 for wireless communication at a base station or device, such as a base station or device including aspects of one or more of the base stations 105 or devices 1005 described with reference to FIG. 1, 2, 10, 11, 12, or 16, in accordance with various aspects of the present disclosure. In some examples, a base station or device may execute one or more sets of codes to control the functional elements of the base station or device to perform the functions described below.

At block 2005, a base station may broadcast a DRS in each of a plurality of discovery time periods. In some examples, the DRSs may be broadcast in a shared channel of a shared radio frequency spectrum band. The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner). In some examples, the DRSs may be transmitted in the shared channel after winning contention for access to part or all of the shared channel. The discovery reference signals may also or alternatively be transmitted in the shared channel without contending for access to the shared channel (e.g., in a plurality of CCA-exempt time periods). The operation(s) at block 2005 may be performed using the wireless communication management module 1020 described with reference to FIG. 10, 11, 12, or 16, or the DRS transmission module 1235 described with reference to FIG. 12.

In some examples of the method 2000, the base station may broadcast a first CC DRS in each of the plurality of discovery time periods. In some examples, the base station may broadcast a second CC DRS in each of the plurality of discovery time periods. In some examples, the base station may broadcast a first CC DRS or a second CC DRS in each of the plurality of discovery time periods. In some examples, the base station may broadcast a first CC DRS and a second CC DRS in each of the plurality of discovery time periods. In some examples, the base station may broadcast a first CC DRS in each of a plurality of first CC discovery time periods, and broadcast a second CC DRS in each of a plurality of second CC discovery time periods. In some cases, an indication of support for first CC communications (e.g., an indication of support for first CC communications by the base station) may be broadcast in a second CC DRS. In some examples, the first CC DRS may include an eCC DRS and the second CC DRS may include a non-eCC DRS.

At block 2010, the base station may receive a first CC connection request from a UE (e.g., via a RACH procedure). Upon receiving the first CC connection request from the UE, the base station may establish a first CC connection with the UE, at block 2015. Also or alternatively, at block 2020, the base station may receive a second CC connection request from a UE (e.g., via a RACH procedure initiated by the same UE or a different UE). Upon receiving the second CC connection request from the UE, the base station may establish a second CC connection with the UE, at block 2025. In some examples, a UE that acquires the base station via a second CC connection request may report to the base station that the UE is first CC capable (i.e., the base station may receive first CC capability information from the UE at block 2030). In these examples, and at block 2035, the base station may configure a first CC connection with the UE. The operation(s) at block 2010, 2015, 2020, 2025, 2030, or 2035 may be performed using the wireless communication management module 1020 described with reference to FIG. 10, 11, 12, or 16, or the connection management module 1240 described with reference to FIG. 12.

Thus, the method 2000 may provide for wireless communication. It should be noted that the method 2000 is just one implementation and that the operations of the method 2000 may be rearranged or otherwise modified such that other implementations are possible.

In some examples, aspects of the methods 1800, 1900, or 2000 described with reference to FIG. 18, 19, or 20 may be combined.

Figure 21:
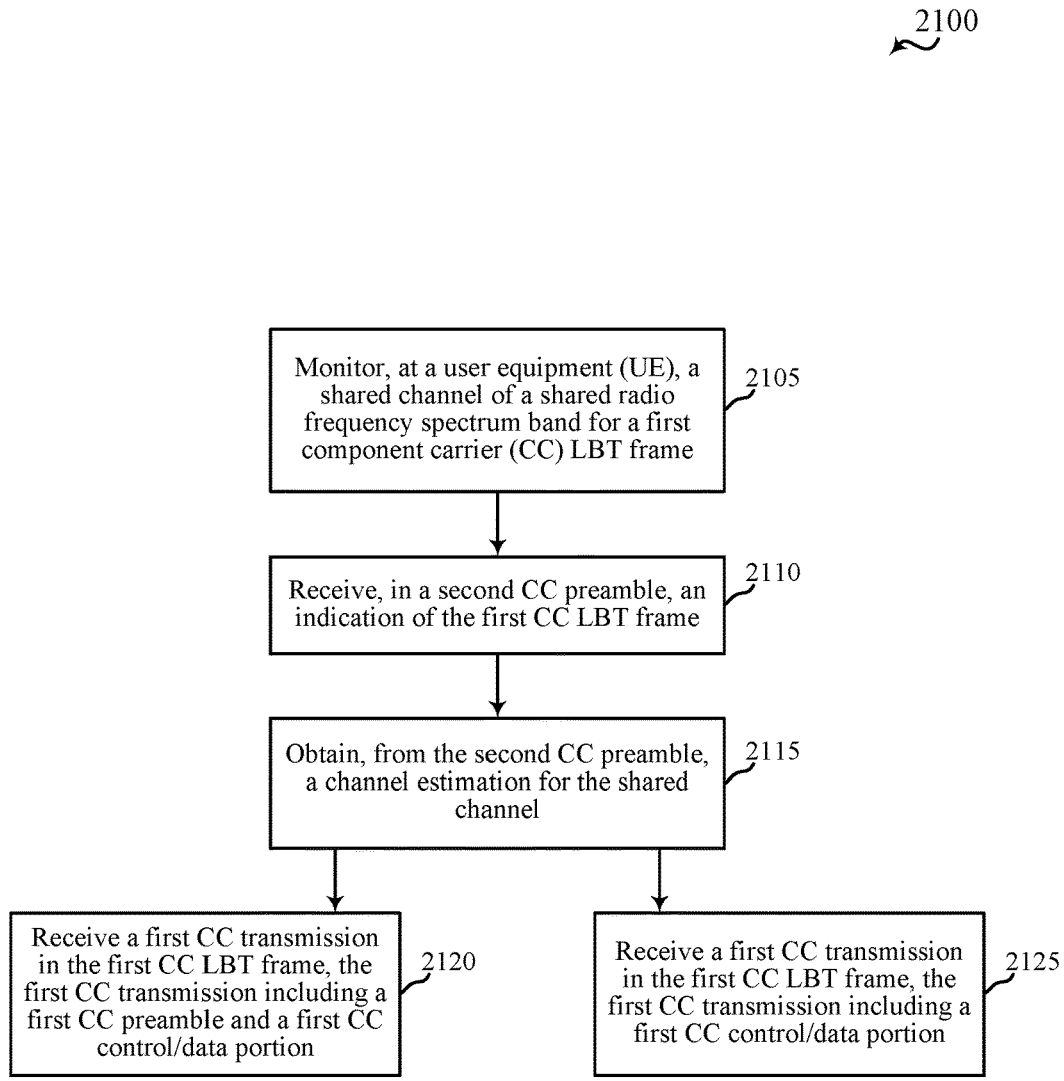
FIG. 21 is a flow chart illustrating an example of a method for wireless communication at a UE or device, in accordance with various aspects of the present disclosure.

FIG. 21 is a flow chart illustrating an example of a method 2100 for wireless communication at a UE or device, such as a UE or device including aspects of one or more of the UEs 115 or devices 1315 described with reference to FIG. 1, 2, 13, 14, 15, or 17, in accordance with various aspects of the present disclosure. In some examples, a UE or device may execute one or more sets of codes to control the functional elements of the UE or device to perform the functions described below.

At block 2105, a UE may monitor a shared channel of a shared radio frequency spectrum band for a first CC LBT frame. The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner). The operation(s) at block 2105 may be performed using the wireless communication management module 1320 described with reference to FIG. 13, 14, 15, or 17, or the shared channel monitoring module 1335 described with reference to FIG. 13.

At block 2110, the UE may receive, in a second CC preamble, an indication of the first CC LBT frame. In some examples, the indication may be received in a control channel of the second CC preamble. In some examples, the indication may include a scrambling, a PLMN ID, a cell ID, control signaling, a sequence, or a combination thereof. In some examples, the UE may receive a Wi-Fi preamble in the second CC preamble. In some examples, the first CC LBT frame may include at least one eCC. The operation(s) at block 2110 may be performed using the wireless communication management module 1320 described with reference to FIG. 13, 14, 15, or 17, or the preamble processing module 1340 described with reference to FIG. 13.

At block 2115, the UE may optionally obtain, from the second CC preamble, a channel estimation for the shared channel. The operation(s) at block 2115 may be performed using the wireless communication management module 1320 described with reference to FIG. 13, 14, 15, or 17, or the channel estimation module 1345 described with reference to FIG. 13.

At block 2120, the UE may optionally receive a first CC transmission in the first CC LBT frame. The first CC transmission may include a first CC preamble and a first CC control/data portion. Alternatively, and at block 2125, the UE may optionally receive a first CC transmission in the first CC LBT frame, where the first CC transmission includes a first CC control/data portion transmitted without a first CC preamble. The operation(s) at block 2120 or 2125 may be performed using the wireless communication management module 1320 described with reference to FIG. 13, 14, 15, or 17, or the LBT frame reception module 1350 described with reference to FIG. 13.

Thus, the method 2100 may provide for wireless communication. It should be noted that the method 2100 is just one implementation and that the operations of the method 2100 may be rearranged or otherwise modified such that other implementations are possible.

Figure 22:
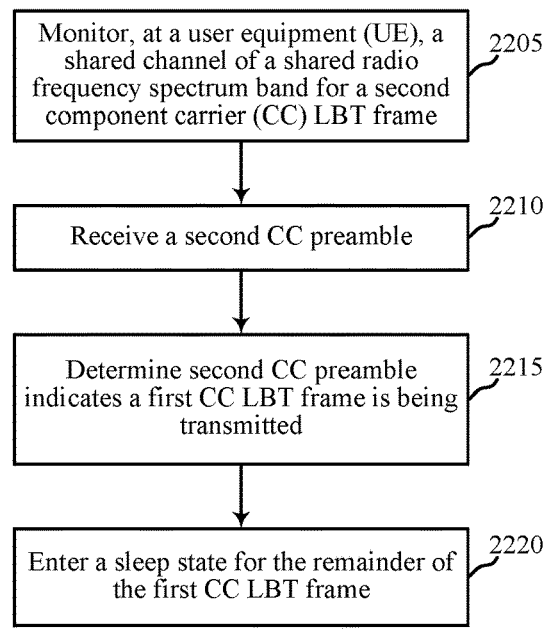
FIG. 22 is a flow chart illustrating an example of a method for wireless communication at a UE or device, in accordance with various aspects of the present disclosure.

FIG. 22 is a flow chart illustrating an example of a method 2200 for wireless communication at a UE or device, such as a UE or device including aspects of one or more of the UEs 115 or devices 1315 described with reference to FIG. 1, 2, 13, 14, 15, or 17. In some examples, a UE or device may execute one or more sets of codes to control the functional elements of the UE or device to perform the functions described below.

At block 2205, a UE may monitor a shared channel of a shared radio frequency spectrum band for a second CC LBT frame. The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner). The operation(s) at block 2205 may be performed using the wireless communication management module 1320 described with reference to FIG. 13, 14, 15, or 17, or the shared channel monitoring module 1335-a described with reference to FIG. 14.

At block 2210, the UE may receive a second CC preamble. In some examples, the UE may receive a Wi-Fi preamble in the second CC preamble. At block 2215, the UE may determine the second CC preamble indicates a first CC LBT frame is being transmitted. In some examples, the first CC LBT frame may include at least one eCC. In some examples, the indication that the second CC preamble is being transmitted in a first CC LBT frame may be received in a control channel of the second CC preamble. In some examples, the indication may include a scrambling, a PLMN ID, a cell ID, control signaling, a sequence, or a combination thereof. The operation(s) at block 2210 and 2215 may be performed using the wireless communication management module 1320 described with reference to FIG. 13, 14, 15, or 17, or the preamble processing module 1340-a described with reference to FIG. 14.

At block 2220, the UE may enter a sleep state for a remainder of the first CC LBT frame. The operation(s) at block 2220 may be performed using the wireless communication management module 1320 described with reference to FIG. 13, 14, 15, or 17, or the power management module 1435 described with reference to FIG. 14.

Thus, the method 2200 may provide for wireless communication. It should be noted that the method 2200 is just one implementation and that the operations of the method 2200 may be rearranged or otherwise modified such that other implementations are possible.

Figure 23:
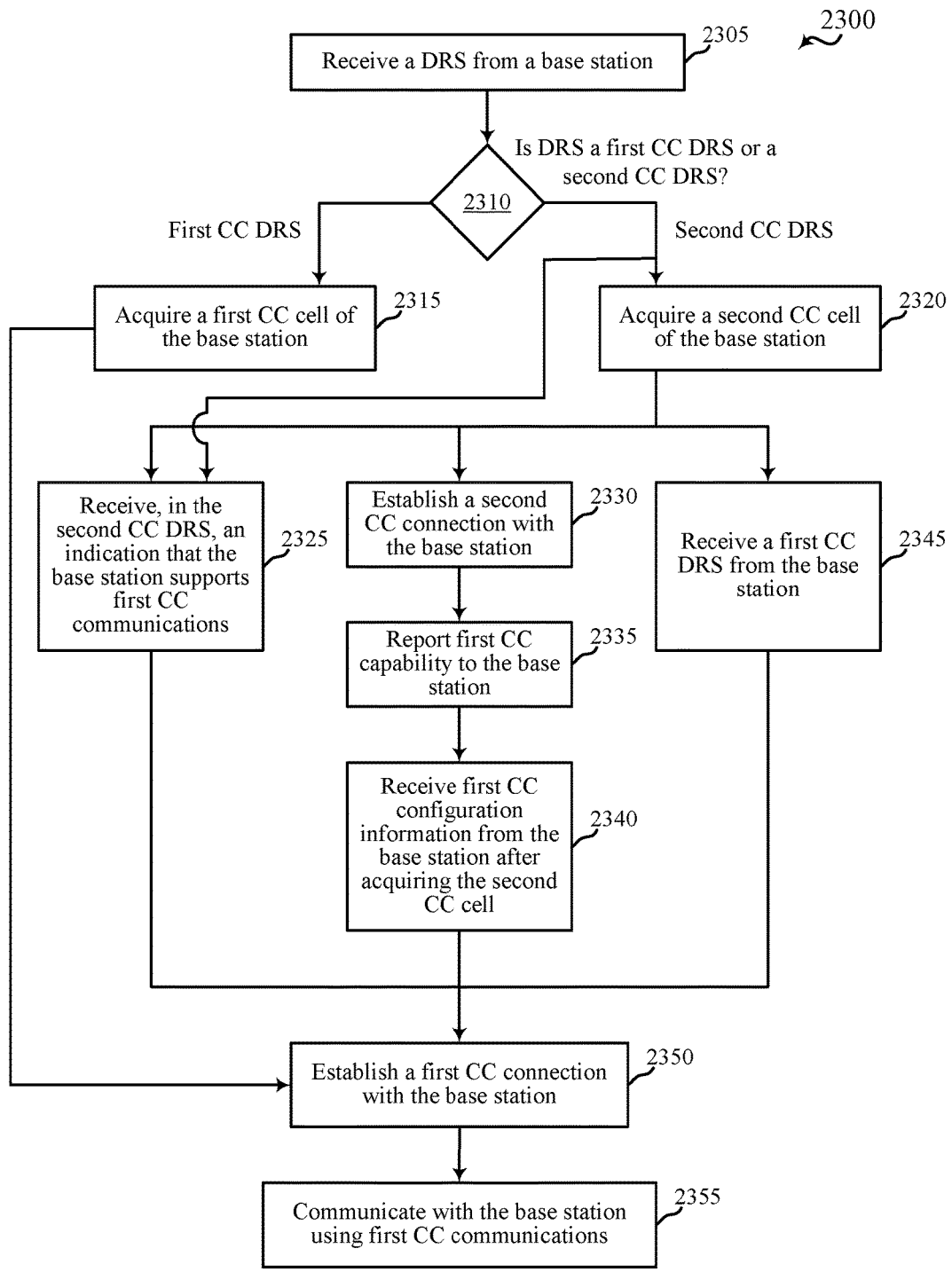
FIG. 23 is a flow chart illustrating an example of a method for wireless communication at a UE or device, such as a UE or device, in accordance with various aspects of the present disclosure.

FIG. 23 is a flow chart illustrating an example of a method 2300 for wireless communication at a UE or device, such as a UE or device including aspects of one or more of the UEs 115 or devices 1315 described with reference to FIG. 1, 2, 13, 14, 15, or 17. In some examples, a UE or device may execute one or more sets of codes to control the functional elements of the UE or device to perform the functions described below.

At block 2305, a UE may receive a DRS from a base station. In some examples, the DRS may be received in a shared channel of the shared radio frequency spectrum band. The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner).

At block 2310, the method 2300 may branch depending on whether the DRS includes a first CC DRS or a second CC DRS. In some examples, the first CC DRS may include at least one eCC DRS and the second CC DRS may include at least one non-eCC DRS. When the DRS includes a first CC DRS, the method 2300 may continue at block 2315. When the DRS includes a second CC DRS, the method 2300 may continue at block 2320 or block 2325. The operation(s) at block 2305 or 2310 may be performed using the wireless communication management module 1320 described with reference to FIG. 13, 14, 15, or 17, or the DRS processing module 1535 described with reference to FIG. 15.

At block 2315, the UE may acquire a first CC cell of the base station. The first CC cell may be acquired based at least in part on the first CC DRS. The operation(s) at block 2315 may be performed using the wireless communication management module 1320 described with reference to FIG. 13, 14, 15, or 17, or the cell acquisition module 1540 described with reference to FIG. 15. Following the operation(s) at block 2315, the method 2300 may continue at block 2350.

At block 2320, the UE may acquire a second CC cell of the base station. The second CC cell may be acquired based at least in part on the second CC DRS. The operation(s) at block 2320 may be performed using the wireless communication management module 1320 described with reference to FIG. 13, 14, 15, or 17, or the cell acquisition module 1540 described with reference to FIG. 15.

At block 2325, 2330, 2335, or 2340, the UE may determine that the base station supports first CC communications. At block 2325, determining the base station supports first CC communications may include receiving an indication that the base station supports first CC communications in the second CC DRS. At blocks 2330, 2335, and 2340, determining the base station supports first CC communications may include establishing a second CC connection with the base station (at block 2330), reporting a first CC capability of the UE to the base station (at block 2335), and receiving first CC configuration information from the base station (at block 2340). At block 2345, determining the base station supports first CC communications may include receiving a first CC DRS from the base station. The operation(s) at block 2325, 2330, 2335, 2340, or 2345 may be performed using the wireless communication management module 1320 described with reference to FIG. 13, 14, 15, or 17, or the communication mode determination module 1545 described with reference to FIG. 15.

At block 2350, and upon determining the base station supports first CC communications, the UE may establish a first CC connection with the base station. The operation(s) at block 2350 may be performed using the wireless communication management module 1320 described with reference to FIG. 13, 14, 15, or 17, or the cell acquisition module 1540 described with reference to FIG. 15.

At block 2355, and upon establish with the base station the first CC connection, the UE may communicate with the base station using first CC communications. The operation(s) at block 2355 may be performed using the wireless communication management module 1320 described with reference to FIG. 13, 14, 15, or 17, or the communication module 1550 described with reference to FIG. 15.

In some examples of the method 2300, the UE may use OFDM numerology of a second CC while receiving a second CC DRS and use OFDM numerology of a first CC while communicating with the base station using first CC communications. A UE may also use OFDM numerology of a second CC after establishing the second CC connection and prior to establishing the first CC connection.

Thus, the method 2300 may provide for wireless communication. It should be noted that the method 2300 is just one implementation and that the operations of the method 2300 may be rearranged or otherwise modified such that other implementations are possible.

In some examples, aspects of the methods 2100, 2200, or 2300 described with reference to FIG. 21, 22, or 23 may be combined.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication at a base station, comprising:
    contending for access to a shared channel of a shared radio frequency spectrum band, wherein:
        contending for access to the shared channel is performed for each of a number of Listen Before Talk (LBT) frames,
        access to the shared channel is won for a first LBT frame, and
        the first LBT frame comprises a first component carrier (CC) LBT frame;

multiplexing first CC communication windows and second CC communication windows in the shared channel, a duration of orthogonal frequency domain multiplexed (OFDM) symbols of the first CC communication windows being different from a duration of OFDM symbols of the second CC communication windows, the multiplexing occurring on the shared channel upon winning contention for access to the shared channel, wherein the multiplexing comprises time division multiplexing the first CC communication windows and the second CC communication windows in the shared channel; and transmitting, in the first CC LBT frame, a first CC preamble and a first CC control/data portion.

2. The method of claim 1, wherein the time division multiplexing is performed at an LBT frame level.

3. The method of claim 1, further comprising:
signaling a partitioning between the first CC communication windows and the second CC communication windows in a control channel of an LBT frame.

4. The method of claim 1, further comprising:
transmitting to a first CC capable user equipment (UE) a first grant of resources for first CC communications.

5. The method of claim 4, further comprising:
transmitting to a second CC capable UE a second grant of resources for second CC communications.

6. The method of claim 1, the method further comprising:
transmitting, in the first CC LBT frame, a second CC preamble.

7. The method of claim 6, further comprising:
transmitting a Wi-Fi preamble in the second CC preamble.

8. The method of claim 1, further comprising:
transmitting a Wi-Fi preamble in the first CC preamble.

9. The method of claim 1, further comprising:
broadcasting a first CC discovery reference signal (DRS) and a second CC DRS in each of a plurality of discovery time periods.

10. The method of claim 1, further comprising:
broadcasting a first CC discovery reference signal (DRS) in each of a plurality of first CC discovery time periods; and
broadcasting a second CC DRS in each of a plurality of second CC discovery time periods.

11. The method of claim 1, further comprising:
broadcasting a first CC discovery reference signal (DRS) or a second CC DRS in each of a plurality of discovery time periods.

12. The method of claim 1, wherein the first CC communication windows comprise at least one enhanced component carrier (eCC) and the second CC communication windows comprise at least one non-eCC.

13. A method for wireless communication at a base station, comprising:
contending for access to a shared channel of a shared radio frequency spectrum band, wherein:
contending for access to the shared channel is performed for each of a number of Listen Before Talk (LBT) frames,
access to the shared channel is won for a first LBT frame, and
the first LBT frame comprises a first component carrier (CC) LBT frame;
multiplexing first CC communication windows and second CC communication windows in the shared channel, a duration of orthogonal frequency domain multiplexed (OFDM) symbols of the first CC communication windows being different from a duration of OFDM symbols of the second CC communication windows, the multiplexing occurring on the shared channel upon winning contention for access to the shared channel, wherein the multiplexing comprises time division multiplexing the first CC communication windows and the second CC communication windows in the shared channel; and transmitting, in the first CC LBT frame, a second CC preamble and a first CC control/data portion, without a first CC preamble.

14. The method of claim 13, further comprising:
transmitting a Wi-Fi preamble in the second CC preamble.

15. A method for wireless communication at a base station, comprising:
contending for access to a shared channel of a shared radio frequency spectrum band, wherein:
contending for access to the shared channel is performed for each of a number of Listen Before Talk (LBT) frames,
access to the shared channel is won for a first LBT frame, and
the first LBT frame comprises a first component carrier (CC) LBT frame;
multiplexing first CC communication windows and second CC communication windows in the shared channel, a duration of orthogonal frequency domain multiplexed (OFDM) symbols of the first CC communication windows being different from a duration of OFDM symbols of the second CC communication windows, the multiplexing occurring on the shared channel upon winning contention for access to the shared channel, wherein the multiplexing comprises time division multiplexing the first CC communication windows and the second CC communication windows in the shared channel;
transmitting a second CC preamble during the first LBT frame; and
transmitting, in the second CC preamble, an indication of whether the first LBT frame is configured as a first CC LBT frame or a second CC LBT frame.

16. The method of claim 15, wherein the indication comprises at least a scrambling, or a public land mobile network (PLMN) identifier (ID), or a cell ID, or control signaling, or a sequence, or a combination thereof.

17. A method for wireless communication at a base station, comprising:
contending for access to a shared channel of a shared radio frequency spectrum band;
multiplexing first component carrier (CC) communication windows and second CC communication windows in the shared channel, a duration of orthogonal frequency domain multiplexed (OFDM) symbols of the first CC communication windows being different from a duration of OFDM symbols of the second CC communication windows, the multiplexing occurring on the shared channel upon winning contention for access to the shared channel;
broadcasting a second CC discovery reference signal (DRS) in each of a plurality of discovery time periods; and
broadcasting in the second CC DRS an indication of support for first CC communications.

18. A method for wireless communication at a base station, comprising:
- contending for access to a shared channel of a shared radio frequency spectrum band;
- multiplexing first component carrier (CC) communication windows and second CC communication windows in the shared channel, a duration of orthogonal frequency domain multiplexed (OFDM) symbols of the first CC communication windows being different from a duration of OFDM symbols of the second CC communication windows, the multiplexing occurring on the shared channel upon winning contention for access to the shared channel;
- receiving a second CC connection request from a UE;
- establishing a second CC connection with the UE;
- receiving an indication that the UE is first CC capable; and
- configuring a first CC connection with the UE after receiving the indication that the UE is first CC capable.

19. An apparatus for wireless communication at a base station, comprising:
- means for contending for access to a shared channel of a shared radio frequency spectrum band, wherein:
  - access is contended for each of a number of Listen Before Talk (LBT) frames,
  - access to the shared channel is won for a first LBT frame, and
  - the first LBT frame comprises a first component carrier (CC) LBT frame;
- means for multiplexing first CC communication windows and second CC communication windows in the shared channel, a duration of orthogonal frequency domain multiplexed (OFDM) symbols of the first CC communication windows being different from a duration of OFDM symbols of the second CC communication windows, the multiplexing occurring on the shared channel upon winning contention for access to the shared channel, wherein the means for multiplexing comprises means for time division multiplexing the first CC communication windows and the second CC communication windows in the shared channel; and
- means for transmitting, in the first CC LBT frame, a first CC preamble and a first CC control/data portion.

20. The apparatus of claim 19, wherein the means for time division multiplexing is performed at an LBT frame level.

21. The apparatus of claim 19, further comprising:
- means for signaling a partitioning between the first CC communication windows and the second CC communication windows in a control channel of an LBT frame.

22. The apparatus of claim 19, further comprising:
- means for transmitting to a first CC capable user equipment (UE) a first grant of resources for first CC communications.

23. The apparatus of claim 22, further comprising:
- means for transmitting to a second CC capable UE a second grant of resources for second CC communications.

24. The apparatus of claim 19, further comprising:
- means for transmitting, in the first CC LBT frame, a second CC preamble.

25. The apparatus of claim 24, further comprising:
- means for transmitting a Wi-Fi preamble in the second CC preamble.

26. The apparatus of claim 19, further comprising:
- means for transmitting a Wi-Fi preamble in the first CC preamble.

27. The apparatus of claim 19, further comprising:
- means for broadcasting a first CC discovery reference signal (DRS) and a second CC DRS in each of a plurality of discovery time periods.

28. The apparatus of claim 19, further comprising:
- means for broadcasting a first CC discovery reference signal (DRS) in each of a plurality of first CC discovery time periods; and
- means for broadcasting a second CC DRS in each of a plurality of second CC discovery time periods.

29. The apparatus of claim 19, further comprising:
- means for broadcasting a first CC discovery reference signal (DRS) or a second CC DRS in each of a plurality of discovery time periods.

30. The apparatus of claim 19, wherein the first CC communication windows comprise at least one enhanced component carrier (eCC) and the second CC communication windows comprise at least one non-eCC.

31. An apparatus for wireless communication at a base station, comprising:
- means for contending for access to a shared channel of a shared radio frequency spectrum band, wherein:
  - access is contended for each of a number of Listen Before Talk (LBT) frames,
  - access to the shared channel is won for a first LBT frame, and
  - the first LBT frame comprises a first component carrier (CC) LBT frame;
- means for multiplexing first CC communication windows and second CC communication windows in the shared channel, a duration of orthogonal frequency domain multiplexed (OFDM) symbols of the first CC communication windows being different from a duration of OFDM symbols of the second CC communication windows, the multiplexing occurring on the shared channel upon winning contention for access to the shared channel, wherein the means for multiplexing comprises means for time division multiplexing the first CC communication windows and the second CC communication windows in the shared channel; and
- means for transmitting, in the first CC LBT frame, a second CC preamble and a first CC control/data portion, without a first CC preamble.

32. The apparatus of claim 31, further comprising:
- means for transmitting a Wi-Fi preamble in the second CC preamble.

33. An apparatus for wireless communication at a base station, comprising:
- means for contending for access to a shared channel of a shared radio frequency spectrum band, wherein:
  - access is contended for each of a number of Listen Before Talk (LBT) frames,
  - access to the shared channel is won for a first LBT frame, and
  - the first LBT frame comprises a first component carrier (CC) LBT frame;
- means for multiplexing first CC communication windows and second CC communication windows in the shared channel, a duration of orthogonal frequency domain multiplexed (OFDM) symbols of the first CC communication windows being different from a duration of OFDM symbols of the second CC communication windows, the multiplexing occurring on the shared channel upon winning contention for access to the shared channel, wherein the means for multiplexing comprises means for time division multiplexing the first CC communication windows and the second CC communication windows in the shared channel; and
means for transmitting a second CC preamble during the first LBT frame; and
means for transmitting, in the second CC preamble, an indication of whether the first LBT frame is configured as a first CC LBT frame or a second CC LBT frame.

34. The apparatus of claim 33, wherein the indication comprises at least a scrambling, or a public land mobile network (PLMN) identifier (ID), or a cell ID, or control signaling, or a sequence, or a combination thereof.

35. An apparatus for wireless communication at a base station, comprising:
means for contending for access to a shared channel of a shared radio frequency spectrum band;
means for multiplexing first component carrier (CC) communication windows and second CC communication windows in the shared channel, a duration of orthogonal frequency domain multiplexed (OFDM) symbols of the first CC communication windows being different from a duration of OFDM symbols of the second CC communication windows, the multiplexing occurring on the shared channel upon winning contention for access to the shared channel;
means for broadcasting a second CC discovery reference signal (DRS) in each of a plurality of discovery time periods; and
means for broadcasting in the second CC DRS an indication of support for first CC communications.

36. An apparatus for wireless communication at a base station, comprising:
means for contending for access to a shared channel of a shared radio frequency spectrum band;
means for multiplexing first component carrier (CC) communication windows and second CC communication windows in the shared channel, a duration of orthogonal frequency domain multiplexed (OFDM) symbols of the first CC communication windows being different from a duration of OFDM symbols of the second CC communication windows, the multiplexing occurring on the shared channel upon winning contention for access to the shared channel;
means for receiving a second CC connection request from a UE;
means for establishing a second CC connection with the UE;
means for receiving an indication that the UE is first CC capable; and
means for configuring a first CC connection with the UE after receiving the indication that the UE is first CC capable.

37. An apparatus for wireless communication at a base station, comprising:
a processor;
memory in communication with the processor; and
instructions stored in the memory, the instructions being executable by the processor to:
contend for access to a shared channel of a shared radio frequency spectrum band, wherein the instructions executable by the processor to contend for access to the shared channel are executable to contend for access for each of a number of Listen Before Talk (LBT) frames, and wherein a first LBT frame comprises a first component carrier (CC) LBT frame;
multiplex first CC communication windows and second CC communication windows in the shared channel, a duration of orthogonal frequency domain multiplexed (OFDM) symbols of the first CC communication windows being different from a duration of OFDM symbols of the second CC communication windows, the multiplexing occurring on the shared channel upon winning contention for access to the shared channel, wherein the instructions executable by the processor to multiplex comprise instructions executable by the processor to time division multiplex the first CC communication windows and the second CC communication windows in the shared channel; and
transmit, in the first CC LBT frame, a first CC preamble and a first CC control/data portion.

38. The apparatus of claim 37, wherein the instructions are executable by the processor to:
transmit, in the first CC LBT frame, a second CC preamble.

39. The apparatus of claim 37, wherein the first CC communication windows comprise at least one enhanced component carrier (eCC) and the second CC communication windows comprise at least one non-eCC.

40. An apparatus for wireless communication at a base station, comprising:
a processor;
memory in communication with the processor; and
instructions stored in the memory, the instructions being executable by the processor to:
contend for access to a shared channel of a shared radio frequency spectrum band, wherein the instructions executable by the processor to contend for access to the shared channel are executable to contend for access for each of a number of Listen Before Talk (LBT) frames, and wherein a first LBT frame comprises a first CC LBT frame;
multiplex first CC communication windows and second CC communication windows in the shared channel, a duration of orthogonal frequency domain multiplexed (OFDM) symbols of the first CC communication windows being different from a duration of OFDM symbols of the second CC communication windows, the multiplexing occurring on the shared channel upon winning contention for access to the shared channel, wherein the instructions executable by the processor to multiplex comprise instructions executable by the processor to time division multiplex the first CC communication windows and the second CC communication windows in the shared channel; and
transmit, in the first CC LBT frame, a second CC preamble and a first CC control/data portion, without a first CC preamble.

41. An apparatus for wireless communication at a base station, comprising:
a processor;
memory in communication with the processor; and
instructions stored in the memory, the instructions being executable by the processor to:
contend for access to a shared channel of a shared radio frequency spectrum band, wherein the instructions executable by the processor to contend for access to the shared channel are executable to contend for access for each of a number of Listen Before Talk (LBT) frames, and wherein a first LBT frame comprises a first component carrier (CC) LBT frame;
multiplex first CC communication windows and second CC communication windows in the shared channel, a duration of orthogonal frequency domain multiplexed (OFDM) symbols of the first CC communication windows being different from a duration of OFDM symbols of the second CC communication windows, the multiplexing occurring on the shared channel upon winning contention for access to the shared channel, wherein the instructions executable by the processor to multiplex comprise instructions executable by the processor to time division multiplex the first CC communication windows and the second CC communication windows in the shared channel;

transmit a second CC preamble during the first LBT frame; and transmit, in the second CC preamble, an indication of whether the first LBT frame is configured as a first CC LBT frame or a second CC LBT frame.

42. The apparatus of claim 41, wherein the indication comprises at least a scrambling, or a public land mobile network (PLMN) identifier (ID), or a cell ID, or control signaling, or a sequence, or a combination thereof.

43. An apparatus for wireless communication at a base station, comprising:

a processor;

memory in communication with the processor; and instructions stored in the memory, the instructions being executable by the processor to:

contend for access to a shared channel of a shared radio frequency spectrum band;

multiplex first component carrier (CC) communication windows and second CC communication windows in the shared channel, a duration of orthogonal frequency domain multiplexed (OFDM) symbols of the first CC communication windows being different from a duration of OFDM symbols of the second CC communication windows, the multiplexing occurring on the shared channel upon winning contention for access to the shared channel;

receive a second CC connection request from a UE;

establish a second CC connection with the UE;

receive an indication that the UE is first CC capable; and configure a first CC connection with the UE after receiving the indication that the UE is first CC capable.

44. A non-transitory computer-readable medium storing computer-executable code for wireless communication, the code executable by a processor to:

contend for access to a shared channel of a shared radio frequency spectrum band, wherein the code executable by the processor to contend for access to the shared channel is executable to contend for access for each of a number of Listen Before Talk (LBT) frames, and wherein a first LBT frame comprises a first component carrier (CC) LBT frame; and multiplex first CC communication windows and second CC communication windows in the shared channel, a duration of orthogonal frequency domain multiplexed (OFDM) symbols of the first CC communication windows being different from a duration of OFDM symbols of the second CC communication windows, the multiplexing occurring on the shared channel upon winning contention for access to the shared channel, wherein the code executable by the processor to multiplex comprises code executable by the processor to time division multiplex the first CC communication windows and the second CC communication windows in the shared channel; and transmit, in the first CC LBT frame, a first CC preamble and a first CC control/data portion.

45. An apparatus for wireless communication at a base station, comprising:

a processor;

memory in communication with the processor; and instructions stored in the memory, the instructions being executable by the processor to:

contend for access to a shared channel of a shared radio frequency spectrum band;

multiplex first component carrier (CC) communication windows and second CC communication windows in the shared channel, a duration of orthogonal frequency domain multiplexed (OFDM) symbols of the first CC communication windows being different from a duration of OFDM symbols of the second CC communication windows, the multiplexing occurring on the shared channel upon winning contention for access to the shared channel;

broadcast a second CC discovery reference signal (DRS) in each of a plurality of discovery time periods; and broadcast in the second CC DRS an indication of support for first CC communications.

* * * * *